US006625313B1

(12) United States Patent
Morita et al.

(10) Patent No.: US 6,625,313 B1
(45) Date of Patent: Sep. 23, 2003

(54) BUSINESS FORM HANDLING METHOD AND SYSTEM FOR CARRYING OUT THE SAME

(75) Inventors: Masahiro Morita, Owariasahi (JP); Masato Teramoto, Nagoya (JP); Tadahiro Itou, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/386,301

(22) Filed: Aug. 31, 1999

(30) Foreign Application Priority Data

Mar. 1, 1999 (JP) .......................................... 11-053311

(51) Int. Cl.[7] ................................................. G06K 9/00
(52) U.S. Cl. ......................... 382/181; 382/137; 382/305
(58) Field of Search ................................. 382/181, 190, 382/135, 139, 137, 176, 187, 305; 707/7

(56) References Cited

U.S. PATENT DOCUMENTS

| 5,256,863 A | * 10/1993 | Ferguson et al. ........... 235/383 |
| 5,468,945 A | * 11/1995 | Huggett et al. ......... 235/462.02 |
| 5,701,500 A | * 12/1997 | Ikeo et al. .................. 382/180 |
| 5,751,849 A | * 5/1998 | Ikeda .......................... 358/462 |
| 6,360,011 B1 | * 3/2002 | Katsumata et al. ......... 382/181 |

FOREIGN PATENT DOCUMENTS

| JP | 9-259222 | 10/1997 |
| JP | 10-232902 | 9/1998 |
| JP | 11-047696 | 2/1999 |
| KR | 49785 | 7/1997 |

* cited by examiner

*Primary Examiner*—Bhavesh M. Mehta
*Assistant Examiner*—Kanji Patel
(74) *Attorney, Agent, or Firm*—Mattingly, Stanger & Malur, P.C.

(57) ABSTRACT

A business form handling system includes an image reading device for reading a business form and a terminal apparatus installed at the window for discriminatively deciding whether a read image corresponds to a first species of business form by referencing form species identifying definition information stored previously in a file. When the read image corresponds to the first species of business form, the terminal apparatus cuts an image from a field corresponding to a format inherent to the first species of business form to thereby recognize contents of statement from the cut image and executes processing in accordance with result of the recognition. Unless the read image corresponds to the first species of business form, the terminal apparatus decides discriminatively whether the read image corresponds to a second species of business form by referencing the form species identifying definition information. When the correspondence is found, the terminal apparatus cuts an image from a field corresponding to a format inherent to the second species of business form to thereby recognize contents of statement from the cut image.

7 Claims, 14 Drawing Sheets

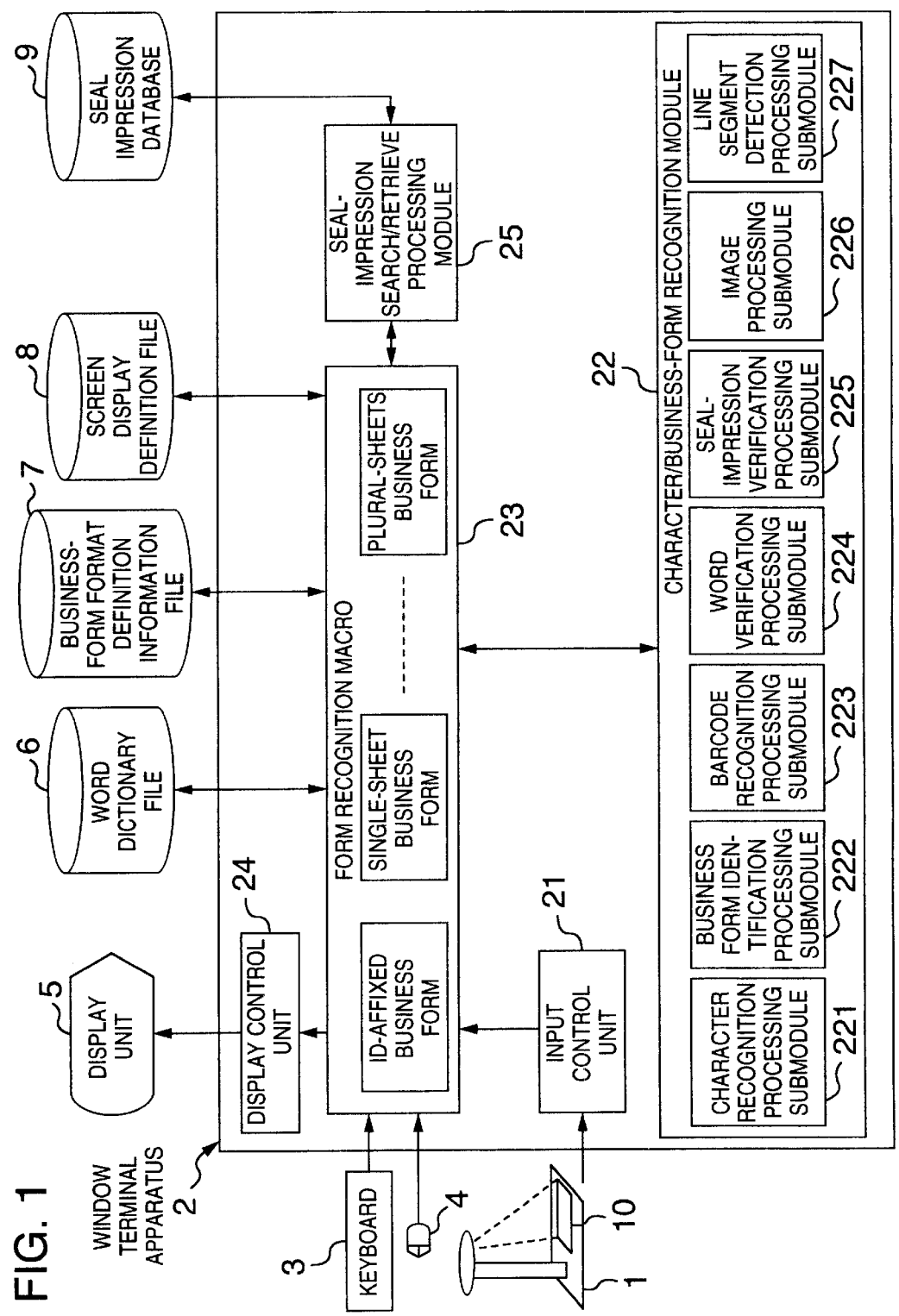

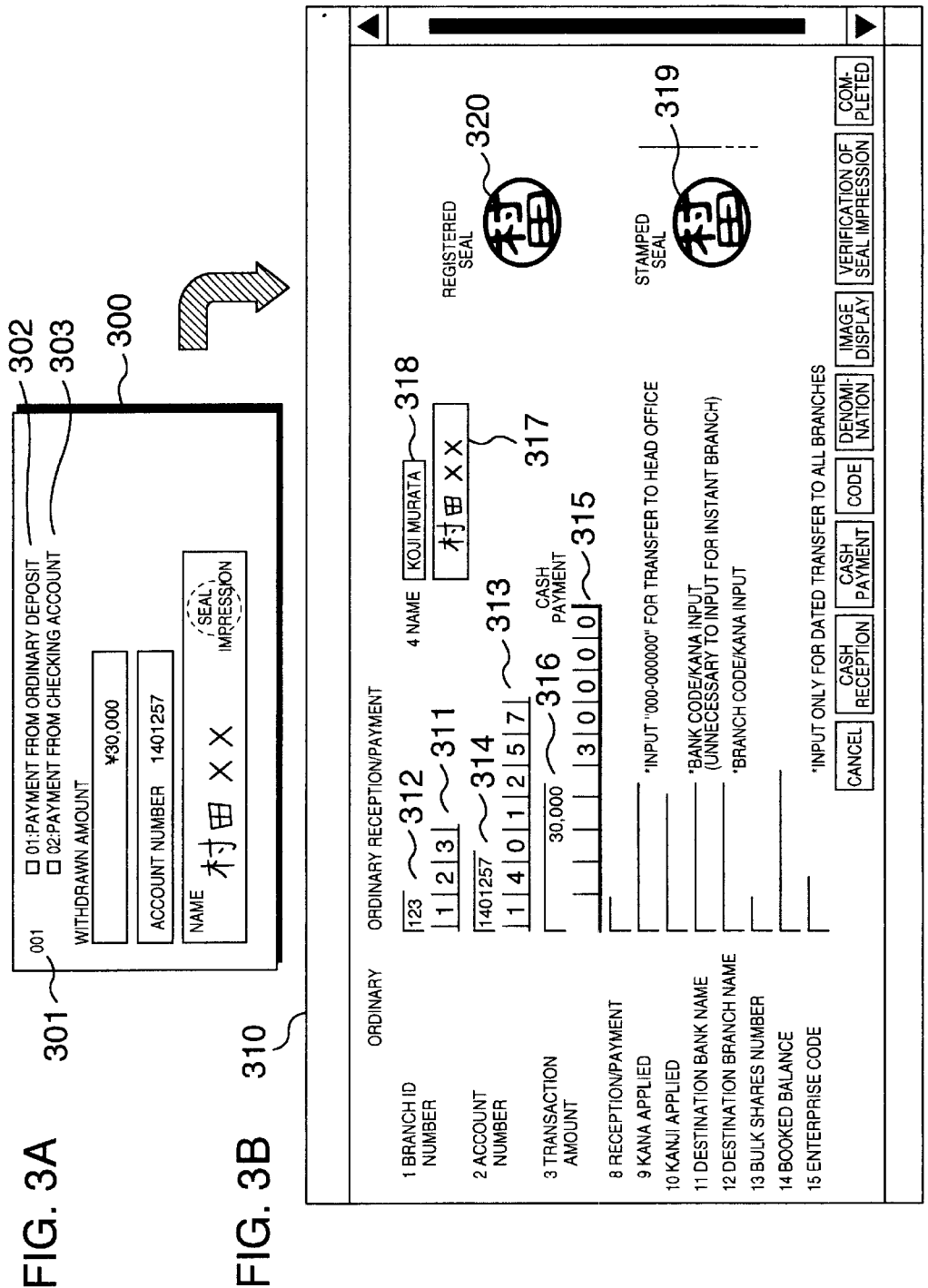

FIG. 5A

TAX PAYMENT SLIP

HEISEI 10 (1998)    MUNICIPAL/PREFECTURAL CITIZEN TAX

ADDRESS
IKEGAMI 1 HARUOKA-CHO OWARIASAHI CITY AICHI PREFECTURE
NAME
村田 ××

AMOUNT CLAIMED ¥30,000※

OTHERS, ITEMS (OCR CHARACTERS)

DUE DATE FOR PAYMENT FEBRUARY 5TH, HEISEI 11 (1999)

ORDINARY    ORDINARY RECEPTION/PAYMENT

1 BRANCH ID NUMBER    123 — 511

2 ACCOUNT NUMBER

3 TRANSACTION AMOUNT    30,000    3 0 0 0 0 — 513

4 NAME    KOJI MURATA — 515
          村田 ×× — 514

CASH PAYMENT — 512

[CANCEL] [CASH RECEPTION] [CASH PAYMENT] [CODE] [DENOMI-NATION] [IMAGE DISPLAY] [VERIFICATION OF SEAL IMPRESSION] [COM-PLETED]

X X ELECTRIC POWER CO. INVOICE FOR JANUARY HEISEI 11 (1999)

01234567890123456789
01234567890123456789

AMOUNT BILLED ¥30,000※

ADDRESS
IKEGAMI 1 HARUOKA-CHO OWARIASAHI CITY AICHI PREFECTURE
NAME
村田××

DUE DATE FOR PAYMENT FEBRUARY 5TH, HEISEI 11 (1999)

ORDINARY  ORDINARY RECEPTION/PAYMENT

1 BRANCH ID NUMBER   [123] ~611

2 ACCOUNT NUMBER

3 TRANSACTION AMOUNT   30,000 ~613   [3|0|0|0|0] ~612
CASH PAYMENT

4 NAME   [KOJI MURATA] ~615
         [村田××] 614

[CANCEL] [CASH RECEPTION] [CASH PAYMENT] [CODE] [DENOMI-NATION] [IMAGE DISPLAY] [VERIFICATION OF SEAL IMPRESSION] [COM-PLETED]

TOKYO CITY INCOME TAX PAYMENT SLIP

01234567890123456789012345678
01234567890123456789012345678

AMOUNT CLAIMED ¥30,000※

ADDRESS
1-1 CHIYODA-KU TOKYO
NAME
村田××

DUE DATE FOR PAYMENT  FEBRUARY 5TH, HEISEI 11 (1999)

ORDINARY  ORDINARY RECEPTION/PAYMENT

1 BRANCH ID NUMBER    [123] ~711

2 ACCOUNT NUMBER

3 TRANSACTION AMOUNT   30,000   ~713   [3|0|0|0|0] ~712
                                        CASH PAYMENT

4 NAME   [KOJI MURATA] ~715
         [村田××]  ~714

| CANCEL | CASH RECEPTION | CASH PAYMENT | CODE | DENOMI-NATION | IMAGE DISPLAY | VERIFICATION OF SEAL IMPRESSION | COM-PLETED |

~710

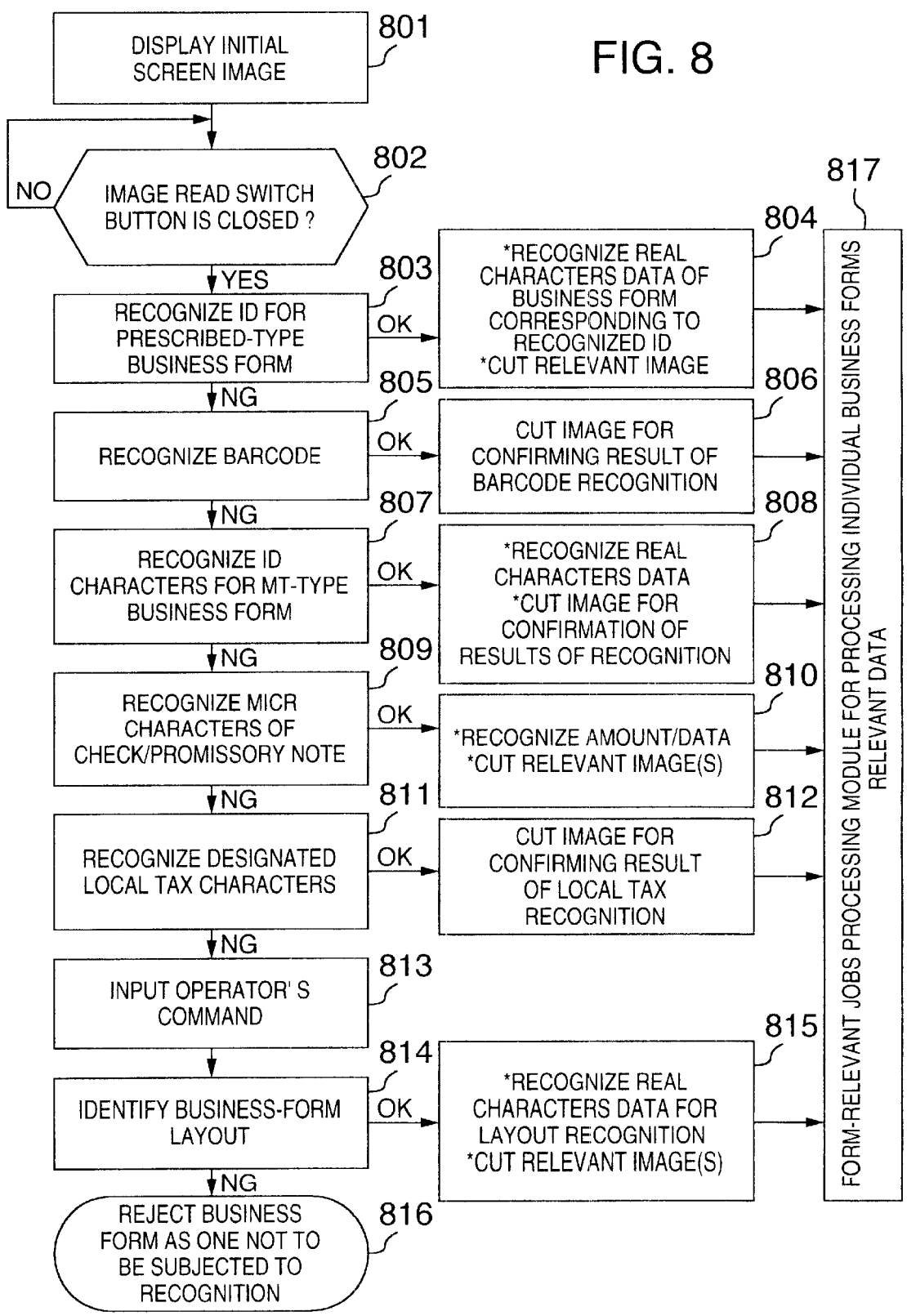

FIG. 10

BUSINESS FORM HANDLING METHOD AND SYSTEM FOR CARRYING OUT THE SAME

BACKGROUND OF THE INVENTION

1. Field of the Invention

The present invention relates to business-form handling method and system for recognizing automatically various species of business forms such as deposit slips, checks, drafts, transfer slips, and the like which are handled, for example, by financial institutions for supplying required information or data set forth i.e., written, printed or stated) on the business forms to a succeeding form-relevant tasks/jobs processing system.

2. Description of Related Art

In the financial institutions such as banks, post offices and the like, there are widely employed automatic teller machines. However, business form such as chits or slips for public utilities charges (tax, telephone charges, electric fees, etc.), checks, drafts and the like can not be handled by the automatic teller machine. Accordingly, money reception, disbursement, transfer and the like transaction businesses which involve handling of business forms such as checks, receipt slips, etc. are carried out by clerks at the window (also referred to as the service counter). Further, services at the window such as reception/payment of large amount of money by checks or the like which can not be handled by the automatic teller machine are carried out by using receipt/payment slips.

Such being the circumstances, clerk in charge of performing so-called counter business at the window by handling various species of business forms are necessarily forced to discriminate definitely the species of the business forms such as the receipt/payment slips received from customers and then check the business forms as to whether the business form is filled in with all necessary particulars and/or whether the business form suffers error in the statement of e.g. the account number, the customer's name and/or the like, whereon relevant jobs are performed in conjunction with the business form as accepted.

The species of the business forms to be handled at the window or counter in banks, post offices or the like can be globally classified into (1) a prescribed-type business form of a format prescribed by a given bank or the like institute, (2) a barcode-affixed business form prescribed by telephone company, electric power company or the like enterprises (business concerns) for receiving public utilities charges such as telephone charges, electric fees, etc. and printed with enterprise identification codes in the form of barcode at a predetermined position or in a predetermined field, (3) a business form which conforms to the standards prescribed by the Ministry of Posts and Telecommunications and on which a symbol code of telephone company, electric power company, consumer credit company or the like is printed at a predetermined position or in a predetermined field in the form of a numeric code having a plurality of digits, (4) checks or promissory notes issued by a given bank and others banks, (5) business forms issued by individual local governments for claiming payment of local taxes, (6) business form of a common format prescribed universally by the banks nationwide, and so forth.

Thus, for the clerk at the window (or counter) of the financial institution such as the bank or the post office, it is a first and big task imposed on him or her to discriminative which of the business form species classified globally as mentioned above the business form as received belongs.

Heretofore, discrimination or identification of the species of business form as received has been performed visually by the clerk at the window. Consequently, when lots of time is taken for discriminative decision of the species of the business form, stagnation will be incurred in the clerical tasks at the window, which in turn will incur degradation of the quality of services for the customers.

Further, in recent years, network configuration financial systems capable of receiving various public utilities charges tend to be adopted not only in the banks and the post offices but also in retail stores or shops. However, since many of clerks of the retail stores lack in training or education concerning the financial network system technology, the clerks will encounter a great difficulty in discriminative determination of the business forms species of large variety, giving rise to a problem that erroneous business form identification may be made. For these reasons, high reliability and high operation efficiency can not be ensured for the financial or monetary system, to another disadvantage.

SUMMARY OF THE INVENTION

In the light of the state of the art described above, it is an object of the present invention to provide a business form handling method which is capable of identifying automatically and positively a large variety of business form species within a reduced time without any appreciable difficulty to thereby enhance efficiency of succeeding form-relevant tasks or jobs in financial institutions or the like.

Another object of the present invention is to provide a business-form handling system for carrying out the method mentioned above.

In view of the above and other objects which will become apparent as the description proceeds, there is provided according to an aspect of the present invention a business form handling method which includes the steps of reading by an image reading device business forms of plural species which differ from one another in respect to a field of the image to be cut, deciding discriminatively whether or not the read image is relevant to a business form of a first species by referencing form species identifying definition information stored previously in a file, and cutting an image from a field corresponding to a format inherent to the business form of the first species when the read image is relevant to the business form of the first species, to thereby recognize the contents of statement from the cut image, whereas when the read image is irrelevant to the business form of the first species, deciding discriminatively whether or not the read image is relevant to a business form of a second species by referencing the form species identifying definition information stored previously in the file, and cutting image from a field corresponding to a format inherent to the business form of the second species when the read image is relevant to the business form of the second species, to thereby recognize the contents of statement from the cut image.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a block diagram showing schematically a system configuration of a business form handling system to which a business form handling method according to an embodiment of the present invention is applied;

FIG. 3A is a view for illustrating an example of a business form having a format prescribed by a financial institution such as a bank itself;

FIG. 3B is a view for illustrating, by way of example, a display screen image of the information as read from the business form shown in FIG. 3A;

FIG. 5A is a view for illustrating an example of a barcode-affixed business form prescribed by a local government or the like public organization;

FIG. 5B is a view for illustrating, by way of an example, a display screen image of the information as read from the barcode-affixed business form shown in FIG. 5A;

FIG. 6A is a view for illustrating an example of a format of a business form prescribed by an enterprise or the like corporation;

FIG. 6B is a view for illustrating, by way of an example, a display screen image of the information as read from the business format shown in FIG. 6A;

FIG. 7A is a view for illustrating an example of an OCR-oriented business form prescribed by a local government or the like;

FIG. 7B is a view for illustrating, by way of example, a display screen image of the information as read from the business form shown in FIG. 7A;

FIG. 8 is a flow chart for illustrating a processing procedure for identifying discriminatively the species of business forms;

FIG. 10 is a view for illustrating an example of a layout-prescribed business form having a layout established;

DESCRIPTION OF THE EMBODIMENTS

Figure 2A:
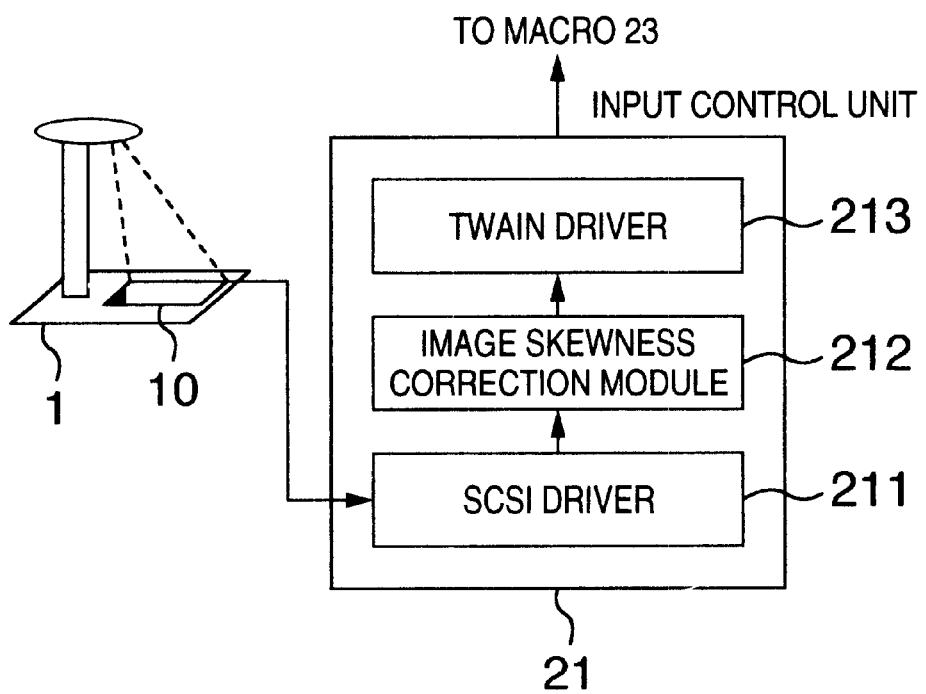
FIG. 2A is a view for illustrating schematically an image input or reading device together with an internal structure of an input control unit connected thereto.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom" and the like are words of convenience and are not to be construed as limiting terms. At this juncture, it should further be added that with the terms "business form" or simply "form", it is contemplated to mean a business-related document with blank spaces filled in at least partially with particulars for execution thereof. As typical ones of such business forms, there may be mentioned a bank-proper form, a tax form, a check, a promissory note, a deposit chit or slip, a payment chit or slip, a transfer chit or slip and so forth.

FIG. 1 is a block diagram showing schematically a system configuration of a business form handling system to which a business form handling method according to an embodiment of the present invention is applied. The business form handling system now under consideration includes an image reading device 1 designed for reading images of characters, symbols, barcodes, seal impressions and/or the like. In this conjunction, it should be mentioned that the image of the seal impression is only exemplary one of the identifying information which is inherent to a customer. In other words, such customer identifying information may include, for example, image of the seal impression mentioned above, signature, finger print, voice print, retina pattern and the like. In the description which follows, it is presumed that the seal impression is used as the identifying information inherent to the customer. However, this is only for convenience of the description. It goes without saying that the present invention is never restricted to such seal impression. To say in another way, any one of the identifying information such as enumerated above may be used in carrying out the present invention. Thus, a seal impression database 9 which constitutes a part of the business form handling system described below in conjunction with the exemplary or preferred embodiments incarnating the present invention is only an exemplary one of the databases designed for storing the identifying information inherent to the customers. The seal impression is only one of the customer identifying information. Similarly, a seal-impression search/retrieve processing module 25 of the illustrated system described below is only an exemplary one of the customer-inherent ID (identification) information search/retrieve processing unit and is designed for searching and retrieving the seal impression of concern from the seal impression database 9. Furthermore, a seal-impression verification processing sub-module 225 of the illustrated system is only an exemplary one of the customer identifying information verification processing module and is designed for verifying the recognition-subjected customer identifying seal impression stamped on a processing subjected business form by matching it with the customer identifying seal impression registered in the seal impression database 9 serving as the customer-inherent ID information database.

Now turning to FIG. 1, the business form handling system according to the instant embodiment of the invention includes in addition to the aforementioned image reading device 1, a terminal apparatus 2 which is disposed, for example, at the window (service counter) in a bank or the like office and which is constituted by a computer such as a personal computer (hereinafter this terminal apparatus will be referred to as the window terminal apparatus) and peripheral units or modules provided in association with the counter terminal apparatus 2 such as a keyboard 3, a mouse (pointing device) 4, a display unit 5, a word dictionary file 6, a business-form format definition information file 7, a screen display definition file 8 and the seal impression database 9 mentioned above. Parenthetically, although the seal impression database 9 can be provided directly in association with the terminal apparatus 2 installed at the window (hereinafter referred to as the window terminal apparatus), the former should preferably be placed under the control of a center computer which is installed at a location distanced from the window terminal apparatus 2 in order to ensure security so that the images of the registered seal impressions can be searched from the window terminal apparatus 2 by way of a communication line.

The image reading device 1 is so arranged as to scan optically a business form 10 disposed on a business-form receiving pedestal obliquely from the above, wherein the image data as read is inputted to an input control unit 21 of the window terminal apparatus 2.

Figure 2B:
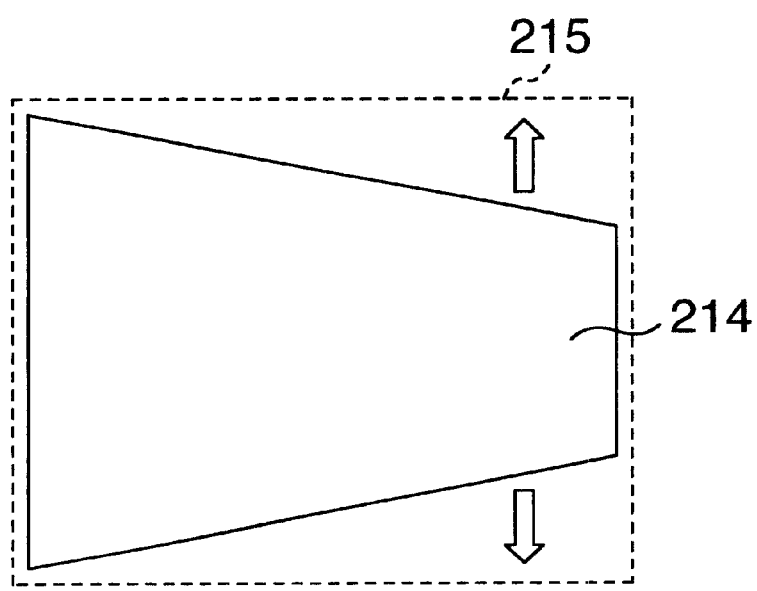
FIG. 2B is a view for illustrating correction of skewness of an image read by the device shown in FIG. 2A.

The window terminal apparatus 2 in turn is comprised of the input control unit 21 mentioned above, a character/business-form recognition module 22, a business form recognition macro 23, a display control unit 24 and the seal-impression search/retrieve processing module 25 mentioned above. The input control unit 21 is designed to control input operation of the image reading device 1. To this end, the input control unit 21 is equipped with an SCSI (Small Computer System Interface) driver 211 for transferring the read image data at a high speed, a TWAIN (Technology Without Any Interested Name) driver 213 serving as a standard interface for the image scanner, and an image skewness correction module 212 for correcting distortion or skewness of the read image, as illustrated in FIG. 2A. More specifically, when the business-form image is read obliquely from the above, the image as read is distorted to a trapezoidal shape, as indicated by reference numeral 214 in FIG. 2B. Such being the circumstances, the image skewness correction module 212 is so designed as to correct the skewed image into a regular rectangular shape, as indicated by numeral 215 in FIG. 2B. On the other hand, the input control unit 21 is so arranged as to transfer the read image data to the business form recognition macro 23 with a format conforming to the TWAIN Standards.

The business form recognition macro 23 is designed to identify discriminatively the species of a given business form on the basis of the read image data inputted through the input control unit 21 and additionally serve for the recognition of characters and a barcode(s) recorded or set forth on the business form as well as for the search and verification of the seal impression. To this end, the form recognition macro 23 is composed of macro programs for calling selectively individual processing submodules of the character/business-form recognition module 22 to thereby carry out discriminative identification of the species of the business form, recognition of the characters, verification of the species of the business form through a matching process and verification of the seal impression. These macro programs can selectively be set up and activated on a form-species basis, i.e., for each of "ID (identification)-affixed business form", "single-sheet business form", "plural-sheets business form" and the like. Parenthetically, with the phrase "ID-affixed business form", it is intended to mean a business form on which code/characters (numerals) for identifying the business form is printed. By way of example, a business form prescribed by a given bank belongs to the species of "ID-affixed business form". With "single-sheet business form", it is contemplated to mean a single chit or slip such as a check, a promissory note, a slip such as issued by a telephone company or an electric power company or the like. Furthermore, "plural-sheets business form" means a business form which is composed of plural sheets. The macro programs prepared on the form species basis are activated in a predetermined sequence in response to an image read start command inputted with the keyboard 3 or the mouse 4 for thereby calling selectively the relevant processing submodules of the character/business-form recognition module 22 to execute the processing for identifying the species of the business form, the character recognition processing and a cut processing for cutting an image portion required for confirmation by the operator, whereon information about the recognized characters, the cut image and the species of the business form are subsequently transferred to a succeeding form-relevant jobs processing program (not shown) or a processing terminal apparatus (not shown either). The form-relevant jobs processing program and the form relevant jobs processing terminal apparatus mentioned just above can be employed, for example, in financial institutions such as banking facilities and designed so as to execute transaction processings such as payment of money, reception thereof or the like by itself or through cooperation with a host computer in dependence on the transaction species or the transaction mode stated on the business form.

The character/business-form recognition module 22 is composed of a character recognition processing submodule 221, a business-form identification processing submodule 222, a barcode recognition processing submodule 223, a word verification processing submodule 224, a seal-impression verification processing submodule 225, an image processing submodule 226 and a line segment detecting processing submodule 227. These processing submodules are implemented in the form of programs activated selectively by the individual macro programs constituting the form recognition macro 23.

The character recognition processing submodule 221 serves for recognizing the recognition-subjected characters (e.g. characters such as alphanumeric characters designating the amount and the ID (identifier) business form, characters of the name of e.g. a customer) set forth on the processing-subjected business form (i.e., the business form being subjected to the processing). When it is discriminatively determined that the business form of concern is of such species on which the recognition-subjected characters (i.e., the characters to be recognized) exist, then the macro program constituting a part of the form recognition macro 23 and relevant to the species of the business form as identified is activated, whereby the characters in an area or field designated by the form recognition macro 23 are recognized. The recognition-subjected characters may be handwritten characters, printed characters, OCR (Optical Character Reader)-oriented characters or MICR (Magnetic Ink Character Recognition)-oriented characters.

The business-form identification processing submodule 222 serves for identifying the species of the concerned business form through matching processing of the read image data of the business form with the definition information identifying the business-form species registered in the business-form format definition information file 7. The business-form identification processing submodule 222 is activated by the relevant macro programs of the form recognition macro 23 which are designed for identifying individually the various species of the business forms, respectively.

In general, the business forms can globally be classified into the ID-affixed business form, the barcode-affixed business form, the OCR-oriented business form, etc.. It should however be noted that even the business forms of the same species (e.g. the ID-affixed business forms) may differ one another in respect to the format dependently on the ID numbers.

In the business form handling system according to the instant embodiment of the invention, processings mentioned below are executed.

(1) The image in the field of the business form designated by the form species identifying definition information is cut for making discriminative decision as to the species of the business form, e.g. whether the business form of concern is the ID-affixed business form or the barcode-affixed business form.

(2) When it is decided that the business form of concern is the ID-affixed business form, the ID number thereof is recognized, whereon subordinate attributes corresponding to this ID number is recognized.

(3) Subsequently, the image in the field designated by the format definition information available as the subordinate attributes information is spliced or cut, whereon character recognition is carried out, for thereby allowing a processing corresponding to the result of recognition to be executed.

At this juncture, it should be mentioned that when the formats of the business forms belonging to a same species can further be subdivided or classified in dependence on the ID numbers or the like, the subdivision or classification can be given in terms of the subordinate attributes.

It should further be added that with the phrase "matching processing", it is intended to mean the pattern matching processing of the image (barcode pattern image, MICR-oriented character pattern image) in the case where the barcodes and/or the MICR-oriented characters printed on the draft/check are to be recognized. On the other hand, for recognition of the business form on which code information composed of a numeral string of plural digits is printed, the matching processing is performed on a character-by-character basis or on a string-by-string basis.

The barcode recognition processing submodule 223 is designed to recognize the recognition-subjected barcode set forth or printed on the processing-subjected business form. When the business form of the species on which the recognition-subjected barcode exists is discriminatively identified, the barcode recognition processing submodule 223 is activated by the macro program of the form recognition macro 23 which has made the identification mentioned above.

The word verification processing submodule 224 is designed to recognize the processing-subjected word (e.g. bank name, company name, address, customer's name, etc.) set forth on the processing-subjected business form. When a give business form of the species on which the recognition-subjected word exists is discriminatively identified, the word verification processing submodule 224 is activated by the macro program of the form recognition macro 23 which has made the identification.

The seal-impression verification processing submodule 225 is designed to match for verification the processing-subjected seal impression stamped on the processing-subjected business form with the seal impression data registered in the seal impression database 9. When the business form of the species on which the recognition-subjected seal impression exists is discriminatively identified, the seal-impression verification processing submodule 225 is activated by the macro program of the form recognition macro 23 which has made the identification.

The image processing submodule 226 is designed to perform the processing of cutting the image such as that of the seal impression or the like which is to be subjected to confirmation of an operator or to be saved as a record for a transaction history on the processing subjected business form. When the business form of the species on which a cut-subjected image such as mentioned above exists is discriminatively identified, the image processing submodule 226 is activated by the macro program of the form recognition macro 23 which has made the identification.

The line segment detection processing submodule 227 is so designed as to detect features of line segments such as those of a table, ruled lines and/or the like printed on the business form. When a given business form is discriminatively identified as the business form of the species which carries the line segments such as those of the table, ruled lines and/or the like, the line segment detection processing submodule 227 is activated by the macro program of the form recognition macro 23 which has made the identification, whereby the detected features of the line segments are matched or collated with the business-form layout information registered previously in the business-form format definition information file 7 by the line segment detection processing submodule 227 for thereby making decision as to which of the business-form layouts the business form now of concern bears correspondence to.

The word dictionary file 6 stores a word dictionary to be referenced by the word verification processing submodule 224 upon word matching for the verification.

The business-form format definition information file 7 is so arranged as to store or register previously therein the information concerning the cut fields of the images for identifying the species of the plural-sheets business form and the subordinate attributes thereof as well as the information concerning recognition-subjected fields such as of characters, seal impression and the like on the business forms of various species, and thus there are registered in the business-form format definition information file 7 the form species identifying definition information of the business forms to be handled and the format definition information as the subordinate attributes corresponding to the plural species of the business forms, respectively. As to the contents of the registration, description will be made later on in conjunction with the processings for identifying the business forms on a species-by-species basis.

On the other hand, the screen display definition file 8 is designed to register screen image definition information for displaying formats of confirmation-dedicated screen images, a manipulation guide (e.g. prompting) screen image, etc., upon displaying the contents of the read business forms on the display unit 5.

Now, description will first be made of representative examples of the business forms which can be processed by the business form handling system and an exemplary display of results of the recognition processing.

FIGS. 3A and 3B are views for illustrating an example of a business form having a format established or prescribed by a given bank (hereinafter this type of business form will be referred to as the prescribed-type business form for convenience of the description) and an exemplary display of the results of recognition processing.

As can be seen in FIG. 3A, the prescribed-type business form denoted generally by numeral 300 is printed with a form ID (identifier) 301 and check boxes 302 and 303 for identifying transaction species or transaction mode. In the case of this illustrative prescribed-type business form, the form ID 301 is represented by "001" while the check boxes 302 and 303 are affixed to "01 payment from ordinary deposit account" and "02 payment from checking account". In the case of this business form 300, a check mark "✓" is entered in the check box 302 by a customer for the withdrawal from the ordinary deposit account. Further, a withdrawn amount "¥30,000" and an account number "1401257" are entered by handwriting within underlying oblong fields, respectively. Further, within a bottom oblong field labeled "NAME", the name of the customer "村田 xx" is entered by handwriting. Parenthetically, it should be added that in the case of the prescribed-type business form 300 illustrated in FIG. 3A, an entry field "branch ID number" to be entered by handwriting is provided, even though it is omitted from illustration for avoiding complexity.

When the prescribed-type business form 300 mentioned above is read, a confirmation-dedicated screen image 310 representing the result of the recognition is generated on the display unit 5, as is illustrated in FIG. 3B. As can be seen in this figure, the confirmation-dedicated screen image 310 is composed of a cut image 311 of the handwritten form ID number "123" and the relevant result 312 of the character recognition, a cut image 313 of the handwritten account number "1401257" and the relevant result 314 of the character recognition, a cut image 315 of the handwritten transaction amount "30000" and the relevant result 316 of the character recognition, a cut image 317 of handwritten customer's name "村田 xx" and the relevant result 318 of the character recognition, a cut image of the seal impression 319 stamped on the prescribed-type business form 300, and a seal impression image 320 registered in the seal impression database 9.

Figure 4A:
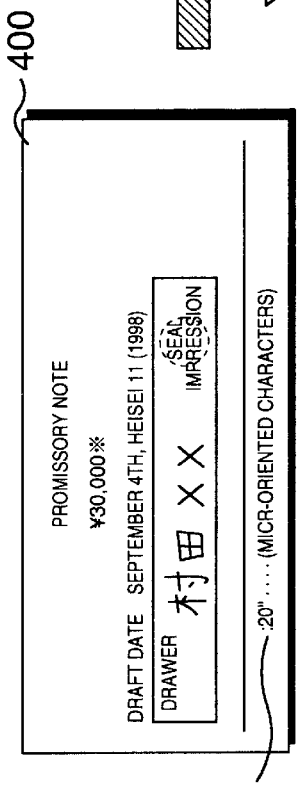
FIG. 4A is a view for illustrating an example of a promissory note to be subjected to processing.
Figure 4B:
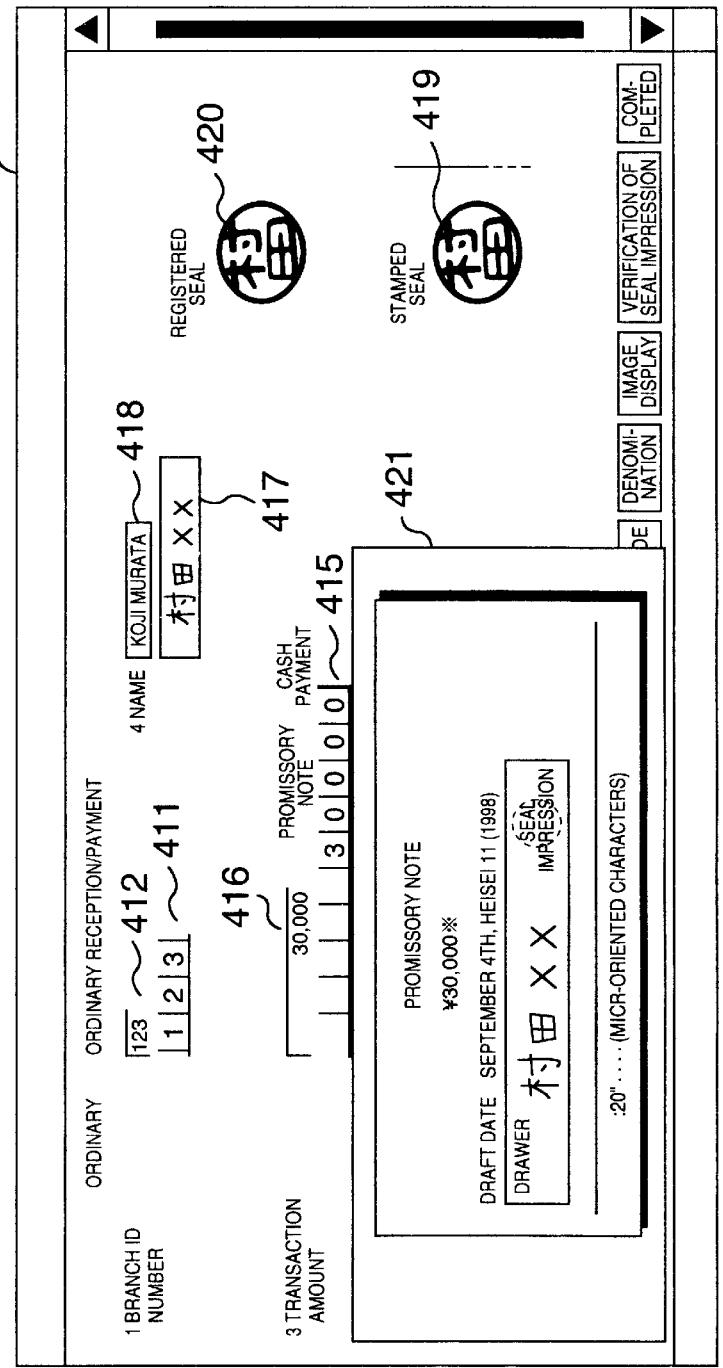
FIG. 4B is a view for illustrating, by way of example, a display screen image of the information as acquired or read from the promissory note shown in FIG. 4A.

FIGS. 4A and 4B are views for illustrating an example of the promissory note and an exemplary display of the recognition result, respectively.

As can be seen in FIG. 4A, the promissory note denoted generally by 400 is printed with a statutorily prescribed MICR-oriented character string (magnetically printed character string) 401 intrinsic to the promissory note at a predetermined position. Accordingly, it is discriminatively determined through a pattern matching with an MICR-oriented character pattern image whether or not the MICR-oriented characters 401 of predetermined font pattern are printed on the business form at the predetermined position. When it is decided that the promissory note now of concern is that of a regular format, recognition of required information and corresponding image cutting operation are performed, whereby a confirmation-dedicated screen image 410 such as illustrated in FIG. 4B is displayed on the display unit 5. Parenthetically, the promissory note 400 illustrated in FIG. 4A has a field in which characters representing the "branch ID number" indicating the place of payment (branch office of the given bank) are printed. However, this field is omitted from illustration in FIG. 4A in order to evade complexity.

The confirmation-dedicated screen image 410 illustrated in FIG. 4B is composed of a cut image 411 of the printed characters "123" of the branch ID number of the bank indicating the place of payment and the relevant result 412 of the character recognition, a cut image 415 of the transaction amount "¥30,000" impressed with a check writer and the relevant result 416 of character recognition, a cut image 417 of handwritten drawer's name "村田 xx" and the relevant result 418 of the character recognition, a cut image of the drawer's seal impression 419 stamped on the promissory note 400, a seal impression image 420 registered in the seal impression database 9 and a reduced image 421 of the promissory note 400 as a whole. Cutting of the reduced image 421 is performed because of necessity of retaining the reduced image as the auxiliary image data for coping with processing errors and/or as an evidence (exhibit) for dealing with question raised by the customer.

FIGS. 5A and 5B are views for illustrating an example of a tax payment slip for municipal/prefectural citizen tax on which barcode(s) is printed and the result of recognition thereof, respectively. As can be seen in FIG. 5A, the municipal/prefectural citizen tax payment slip may assume such a format in which the name of a given local government and a payment destination account number are printed in the form of barcodes at predetermined positions prescribed by the local government. For convenience of the description which follows, the business form of this species is referred to as the barcode-affixed business form 500. According to the teaching of the present invention incarnated in the instant embodiment, the image of a field determined by the barcode-affixed form species identifying definition information is cut for deciding through a pattern matching whether or not the barcode(s) is set forth. When it is detected that the area or field mentioned above contains the barcode(s) printed, the business form now of concern is decided or identified as the barcode-affixed business form, and then a branch ID number or the like of a payment-destined financial institution is recognized or determined on the basis of the content of the barcode (i.e., result of barcode decoding). Subsequently, processings for cutting the images of required information such as the name, the amount and the like as well as character recognition processings are carried out. The result of these processings is displayed on the display unit 5 as a confirmation-dedicated screen image 510, as is illustrated in FIG. 5B. More specifically, referring to FIG. 5B, the confirmation-dedicated screen image 510 contains the confirmation result 511 of the "branch ID number" of the payment-destined bank branch, a cut image 512 of transaction amount "¥30,000" printed or entered by handwriting together with a relevant character recognition result 513 thereof, and a cut image 514 of the taxpayer's name "村田 xx" printed or entered by handwriting together with a relevant recognition result 515 thereof.

FIGS. 6A and 6B are views for illustrating an example of a business form for paying a charge or fee in which a symbol code of an electric power company or the like is set forth in the form of a numeric code of plural digits and an exemplary display of the result of recognition thereof, respectively. As can be seen in FIG. 6A, an MT-type business form 600 for fee payment issued by an electric power company "xx Electric Power Co." may assume such a format in which symbol code(s) or the like inherent to the electric power company is printed at a predetermined position(s) which is designated by the company in the form of a numeric code(s) 601 having a plurality of digits. For convenience of the description which follows, the business form of this format will be referred to as the MT-type business form. According to the teaching of the present invention incarnated in the instant embodiment, in such MT-type business form 600, the image of a field defined by the definition information for identifying the MT-type business form is cut for thereby deciding through a character recognition processing whether or not the numeric code of plural digit code is set forth in the field. When the field in which the plural-digit numeric code(s) 601 is printed is detected, the business form now of concern is decided or identified as the MT-type business form and then the symbol code, etc. of the electric power company or the like claiming the fee is recognized or determined on the basis of the content of the numeric code(s). Subsequently, processing for cutting the images of required information as well as the character recognition processing is carried out. The result of these processings is displayed in a confirmation-dedicated screen image 610, as is illustrated in FIG. 6B. More specifically, referring to FIG. 6B, the confirmation-dedicated screen image 610 contains the confirmation result 611 of the "branch ID number" of a payment-destined bank branch, a cut image 612 of transaction amount "¥30,000" printed or entered by handwriting together with a relevant character recognition result 613, and a cut image 614 of a payer's name "村田 xx" entered by handwriting together with a relevant recognition result 615. Incidentally, with the phrase "MT-type business form" mentioned above, it is contemplated to mean the business form used in the mail transfer MT service (also referred to as the MT service or postal money order service). Further, the phrase "mail transfer MT service" means such service that a message concerning the contents of ordinary payment for postal money order by transfer (i.e., OCR-oriented character data written previously on an MT-service-dedicated payment slip by a subscriber) is delivered to the subscriber in the form of a magnetic tape or a floppy disk recording the message, instead of sending by mail an image output payment disposal slip.

FIGS. 7A and 7B are views for illustrating an example of a business form for tax payment in which a symbol code which represents a local government or the like is set forth in the form of a numeric code having a plurality of digits and an example of the display of recognition result of the business form, respectively. As can be seen in FIG. 7A, the business form 700 dedicated for payment of the income tax as issued by a local government such as "Tokyo-City Government" may assume such a format in which a symbol code(s) or the like inherent to the local government is printed at a predetermined position designated by the local government in the form of an OCR-oriented character string 701 having plural digits. For convenience of the description which follows, the business form of this type will be referred to as the OCR-oriented business form 700. The OCR-oriented business form 700 is also processed through similar processings as those for the MT-type business form 600 described hereinbefore by referring to FIGS. 6A and 6B. More specifically, in the OCR-oriented business form 700, an image at a position determined by the definition information for identifying the OCR-oriented business form is cut, for thereby deciding through a character recognition processing whether or not the plural-digit OCR-oriented character string is found in the cut image. When the plural-digit OCR-oriented character string 701 is detected, the business form now of concern is decided or identified as the OCR-oriented business form, and then the symbol code or the like of the payment-destined local government is recognized or determined on the basis of the content of the numeric code (recognition result of the numerical value). Subsequently, processing for cutting the images of required fields as well as character recognition processing is carried out. The results of these processings are displayed on the display unit 5 as a confirmation-dedicated screen image 710, as is illustrated in FIG. 7B. More specifically, referring to FIG. 7B, the confirmation-dedicated screen image 710 contains the recognition result 711 of a "branch ID number" of a payment-destined bank, a cut image 712 of transaction amount "¥30,000" printed or entered by handwriting together with a relevant character recognition result 713, and a cut image 714 of the taxpayer's name "xx" printed or entered by handwriting together with a relevant recognition result 715.

FIG. 8 is a flow chart for illustrating a procedure for identifying discriminatively the species of the business forms having aforementioned various formats, respectively, and read by the image reading device 1, recognizing or determining the subordinate attributes on the basis of the ID numbers or the like, and recognizing the contents set forth on the business forms.

Describing in general, in the business form handling system now under consideration, an identifying procedure is established for discriminatively identifying or determining to which of plural species the processing subjected business form belongs in accordance with a predetermined sequence to thereby execute identification of the species of the business form of concern. In each of individual business form identifying processings, an image in a field designated by the form species identifying definition information registered previously in the business-form format definition information file 7 is cut from a read image of the business form read by the image reading device 1, whereon recognition of the cut image (e.g. character recognition or recognition of image pattern such as barcode or the like) is effected, which is then followed by the processing for recognizing the species of the business form. When it is determined discriminatively that the business form of concern is of the relevant species, an image in the field set previously as the subject for recognition by the format definition information of the business form of the relevant species is cut without executing other succeeding identifying procedure, which is then followed by the execution of the processing for recognizing the subordinate attributes and then the processing for recognizing the contents as stated or set forth on the business form.

Figure 9:
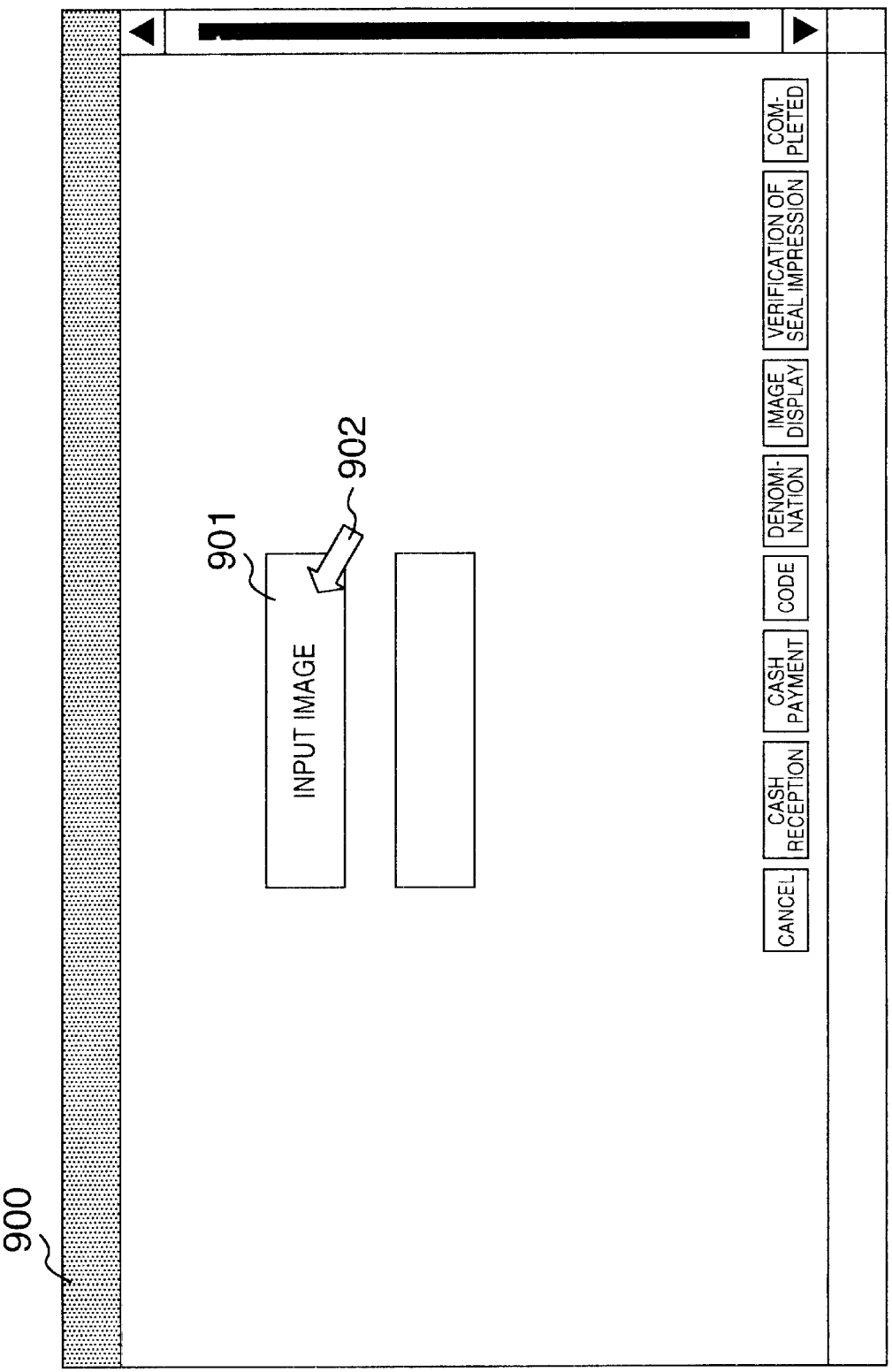
FIG. 9 is a view for illustrating an example of an initial screen image in the business form identifying processing procedure.

Now, description will be made in detail. When the business form handling system is activated, an initial screen image 900 such as illustrated in FIG. 9 is generated on the display unit 5 in a step 801. Thus, the operator can place a processing-subjected business form on the pedestal of the image reading device 1 and click an image input start button 901 appearing in the initial screen image 900 with the aid of the mouse 4 to thereby input an image input command. Alternatively, an image input start command may be inputted through manipulation of the keyboard 3.

When the inputting of the image input start command is recognized by the form recognition macro 23 of the window terminal apparatus 2 in a step 802, a read start signal is sent to the image reading device 1 through the medium of the input control unit 21, whereby the business form image read operation is started by the image reading device 1. The image reading device 1 transfers the read image data of the business form to the form recognition macro 23 by way of the input control unit 21. The form recognition macro 23 is so designed as to identify the species of the processing-subjected business forms on the basis of the read image data as transferred in a predetermined sequence. In this conjunction, it is presumed, only by way of example, that the business forms undergo the identifying processing in the order of the prescribed-type business form (FIG. 3), barcode-affixed business form (FIG. 5), MT-type business form (FIG. 6), MICR-oriented business form such as the check/draft (FIG. 4), processing-subjected business form issued by a local government (FIG. 7) and then a business form other than those mentioned above which has a layout registered previously in the business-form format definition information file 7. The last mentioned business form will be referred to as the layout-prescribed business form.

To say in another way, the form recognition macro 23 activates the macro program for identifying the prescribed-type business form, the macro program for identifying the barcode-affixed business form, the macro program for identifying the MT-type business form, the macro program for identifying the check/draft, the macro program for identifying the OCR-oriented business form issued by the local governments and the macro program for identifying the layout-prescribed business form, respectively, in this sequence.

The reason why the bank-prescribed-type business form is assigned with the highest preference or priority can be explained by the fact that the number of the bank-prescribed-type business forms to be handled is expected to be greatest among the business forms mentioned above. However, it goes without saying that the sequence in which the various business forms mentioned above are to be handled can be altered by changing the order or sequence in which the macro programs of the form recognition macro 23 which bear correspondence or relevance to the species of the individual single-sheet business forms, respectively, are activated. Further, it should be added that when the number of the species of the business forms to be handled increases, this can be coped with by additionally setting up a macro program for the added business-form species without need for modifying the structure of the character/business-form recognition module 22.

Now turning back to FIG. 8, the macro program of the form recognition macro 23 which corresponds to the prescribed-type business form affixed with the ID (identifier) is activated, whereon the character recognition processing submodule 221, the business-form identification processing submodule 222, the word verification processing submodule 224, the seal-impression verification processing submodule 225 and the image processing submodule 226 of the character/business-form recognition module 22, respectively, are activated, to thereby make decision as to whether the business form of concern is the prescribed-type business form or not (step 803). When it is decided that the business form of concern is the prescribed-type business form printed with the business form ID, images in the fields designated previously by the business-form format definition information corresponding to the ID-affixed prescribed-type business form are cut, which is then followed by the processing for recognizing the characters (e.g. those of the account number, the customer's name, the transaction amount and the like real data), whereon an image such as the seal impression image which is previously designated by the business-form format definition information is cut (step 804). The results of the above-mentioned processings (i.e., information of the recognized characters, the cut image and the species of the business form) are transferred to the succeeding forms-relevant jobs processing module 817.

By contrast, when it is decided that the business form of concern is not the prescribed-type business form, then the macro program of the form recognition macro 23 which corresponds to the barcode-affixed business form is activated, whereon the character recognition processing submodule 221, the business-form identification processing submodule 222, the barcode recognition processing submodule 223, the word verification processing submodule 224, the seal-impression verification processing submodule 225 and the image processing submodule 226 of the character/business-form recognition module 22 are activated, to thereby make decision as to whether the business form of concern is the barcode-affixed business form or not (step 805). When it is decided that the business form of concern is the barcode-affixed business form printed with the barcode(s), images in the areas or fields designated previously by the business-form format definition information corresponding to the barcode-affixed business form is cut, which is then followed by the processing for recognizing the characters of the images as cut (e.g. the customer's name, the transaction amount and the like), whereon images (handwritten characters, printed characters or the like) in the fields which are previously designated by the business-form format definition information are cut (step 806). The results of the above-mentioned processings (i.e., information of the recognized characters and the cut images and the information about the species of the business form) are transferred to the succeeding forms-relevant jobs processing module 817.

On the other hand, when it is decided that the business form of concern is not the barcode-affixed business form, then the macro program of the form recognition macro 23 which corresponds to the MT-type business form is activated, whereon the character recognition processing submodule 221, the business-form identification processing submodule 222, the word verification processing submodule 224, the seal-impression verification processing submodule 225 and the image processing submodule 226 of the character/business-form recognition module 22 are activated, to thereby make decision on the basis of the numeric code strings as to whether the business form of concern is the MT-type business form or not (step 807). When it is decided that the business form now of concern is the MT-type business form, images in the fields designated previously by the business-form format definition information corresponding to the MT-type business form is cut, which is then followed by the processing for recognizing the characters (e.g. the customer's name, the transaction amount and the like real data), whereon images (handwritten characters, printed characters and the like) in the fields which are previously designated by the business-form format definition information is cut (step 808). The results of the above-mentioned processings (i.e., information of the recognized characters and the cut image and the information about the species of the business form) are transferred to the succeeding forms-relevant jobs processing module 817.

On the other hand, when it is decided that the business form of concern is not the MT-type business form, then the macro program of the form recognition macro 23 makes decision on the basis of presence or absence of the MICR-oriented characters as to whether or not the business form of concern is a check or a draft (a promissory note, a draft bill of exchange) in a step 809. When it is decided that the business form of concern is a draft or a check, images in the fields designated previously by the business-form format definition information corresponding to the MICR-oriented characters printed on the draft/check are cut, which is then followed by the processing for recognizing the characters (e.g. branch ID number of the payment-destined bank, the customer's name, the transaction amount and the like), whereon images in the field which is previously designated by the business-form format definition information concerning the seal impression images or the like is cut to thereby generate a reduced image of the draft/check as a whole (step 810). The results of the above-mentioned processings (i.e., information concerning the recognized characters and the cut image and the information about the species of the business form and the reduced image of the draft/check) are transferred to the succeeding forms-relevant jobs processing module 817.

Furthermore, when it is decided that the business form of concern is neither the draft nor the check, then the macro program of the form recognition macro 23 which corresponds to the OCR-oriented business form for the payment of the local tax is activated, whereon the character recognition processing submodule 221, the business-form identification processing submodule 222, the word verification processing submodule 224, the seal-impression verification processing submodule 225 and the image processing submodule 226 of the character/business-form recognition module 22 are activated, to thereby make decision on the basis of the character recognition processing of the OCR-oriented characters of plural digits as to whether the business form of concern is the OCR-oriented business form or not (step 811). When it is decided that the business form of concern is the OCR-oriented business form, images in the fields designated previously by the business-form format definition information corresponding to the OCR-oriented characters printed on the OCR-oriented business form are cut, which is then followed by the processing for recognizing the characters of the cut images (e.g. the customer's name, the transaction amount and the like), whereon images (handwritten characters, printed characters or the like) of the fields which are previously designated by the business-form format definition information are cut (step 812). The results of the above-mentioned processings (i.e., information about the recognized characters, the cut image and the species of the business form) are transferred to the succeeding forms-relevant jobs processing module 817.

However, when the business form of concern is of the species which does not correspond to any one of those mentioned above, a message to this effect is displayed on the screen of the display unit 5 while prompting the operator to input a command for executing the recognition processing for the business form of the other species than those mentioned above (step 813). When the operator inputs the affirmation response, then decision is made as to whether or not the business form of concern has a layout corresponding to the layout-prescribed business form 1000 registered previously in the business-form format definition information file 7. To this end, the macro program of the form recognition macro 23 which corresponds to the layout-prescribed business form is activated, whereon the character recognition processing submodule 221, the business-form identification processing submodule 222, the word verification processing submodule 224, the seal-impression verification processing submodule 225, the image processing submodule 226 and a line segment detection processing submodule 227 of the character/business-form recognition module 22 are activated, to thereby make decision as to whether the business form of concern is the layout-prescribed business form or not (step 814). In succession, images in the fields designated previously by the business-form format definition information corresponding to the layout-prescribed business form is cut, which is then followed by the processing for recognizing the characters of the cut images (e.g. the customer's name, the transaction amount and the like real data), whereon images (handwritten characters, printed characters or the like) of the fields which are previously designated by the business-form format definition information are cut (step 815). The results of the above-mentioned processings (i.e., the information about the recognized characters, the cut image and the species of the business form) are transferred to the succeeding forms-relevant jobs processing module 817.

In the case where the business form of concern is of the species which does not coincide with any one of those mentioned above, the business form of concern is not accepted but rejected as the business form which is not the recognition-subjected business form (step 816).

Figure 11:
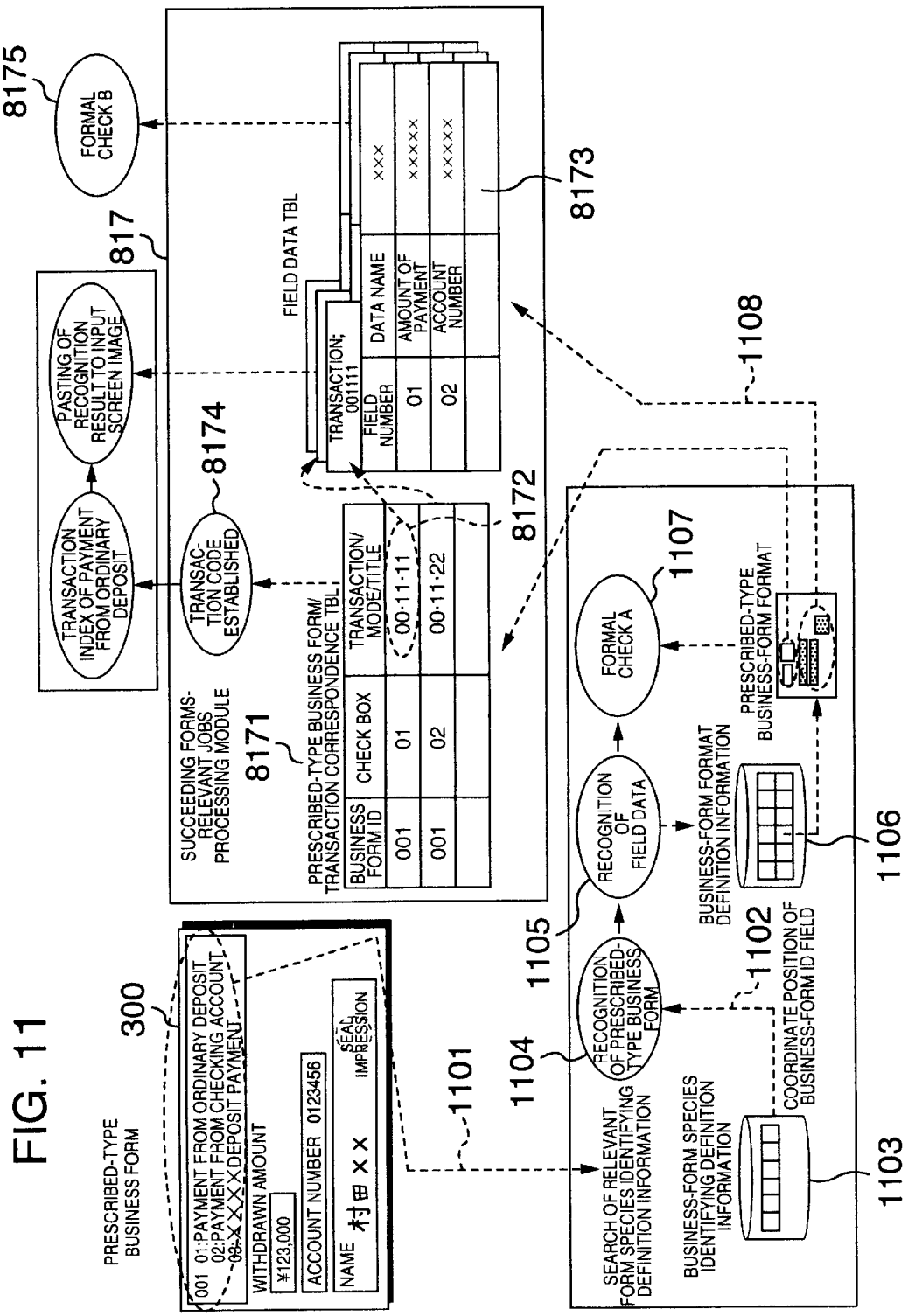
FIG. 11 is a view for illustrating in detail a processing procedure for a prescribed-type business form such as illustrated in FIG. 3A.

FIG. 11 is a view for illustrating in detail the processing procedure for identifying or deciding discriminatively whether or not a processing-subjected business form is the prescribed-type business form typified by the form 300 shown exemplarily in FIG. 3. In this processing procedure, images of the print fields for the form ID (identifier) 301 and the check boxes 302 and 303 on the prescribed-type business form are cut by referencing the form species identifying definition information 1103. Subsequently, it is checked whether or not the characters and the symbols "☒" marked with "✓" exist in the field of the form ID 301 and the check boxes 302 and 303 of the prescribed-type business form concerned. In this conjunction, it should be mentioned that the form ID 301, the check boxes 302 and 303, and the character strings such as "ordinary deposit payment" are printed on the prescribed-type business form 300 at designated positions or fields, respectively, and thus the coordinate data indicating the print fields of the form ID 301, the check boxes 302 and 303 and the character string "ordinary deposit payment" or the like are, respectively, registered in the business-form format definition information file 7 as the form species identifying definition information 1103 corresponding or relevant to the prescribed-type business forms.

Such being the circumstances, processings described below are executed.

(1) From the image data read from the processing-subjected business form, the images in the coordinate fields designated by the coordinate data mentioned above are cut, to thereby effectuate the character recognition for the cut images in order to check whether or not there exist the form ID 301, the symbols "☒" representing the check boxes 302 and 303, respectively, the character string "ordinary deposit payment" and the symbol "☒" marked with "✓" (steps 1101 and 1102). When this processing results in affirmation, the processing subjected business form is recognized as the prescribed-type business form 300 (step 1104), whereon processing for recognizing the data (field data) of characters, images and the like in the fields to be recognized on the prescribed-type business form 300 is executed (step 1105). When the processing-subjected business form now concerned is, for example, the prescribed-type business form 300 illustrated in FIG. 3, it can be determined that the form ID is "001" and that the transaction species or transaction mode is "ordinary deposit payment". In other words, it can be discerned that the processing-subjected business form is an prescribed-type business form affixed with the form ID "001" as the subordinate attributes. Parenthetically, with the phrase "field data", it is intended to mean such data which is required for executing the succeeding forms-relevant jobs processings.

(2) In a field data recognition processing, business-form format definition information 1106 corresponding to the prescribed-type business form 300 having the form ID "001" is acquired at first. Thereafter, images in the fields designated by the business-form format definition information 1106 are cut, whereon the characters, symbols and the like set forth in the cut fields undergo recognition processing by the character recognition processing submodule 221.

When it is found at this stage that the processing-subjected business form is, for instance, the prescribed-type business form 300 illustrated in FIG. 3, there can be obtained the results of recognition for the branch ID number 312 the account ID number 314, the account number 314', the transaction amount 315 and the customer's name 318 (step 1108). At the same time, image of the seal impression 319 is cut by activating the image processing submodule 226, whereby corresponding data of the seal impression can be obtained. More specifically, when data of the account number 314 and the customer's name 318 are obtained, the seal-impression verification processing submodule 225 acquires from the seal impression database 9 the image data of the customer's seal impression 320 specified by the account number 314 and the customer's name 318 through the seal-impression search/retrieve processing module 25 in response to the command from the business form recognition macro program relevant to the prescribed-type business form 300, whereon the pattern matching processing of the seal impression image 319 cut from the prescribed-type business form 300 with the image data of the registered seal impression image 320 is executed, whereby a message as to whether the seal impression image coincides with the registered one or a message indicating a degree of similarity determined arithmetically is displayed on the screen of the display unit 5.

(3) Upon completion of the field data recognition processing, a processing "formal check processing A" 1107 is executed. Although the processing "formal check processing A" 1107 does not constitute a major part of the present invention for discriminatively determining the species of the business forms, the processing "formal check processing A" 1107 is effective for deciding whether or not contradiction is present in the field data as recognized or for formal check such as statement omission check. When a formal defect such as the omission of statement is found, a corresponding message can be generated on the screen of the display unit 5.

The business form ID and the contents of the check boxes obtained in the S1104 are stored in a prescribed-type business form/transaction correspondence table 8171 of the forms-relevant jobs processing module 817. More specifically, upon reception of the business-form ID and the content of the check box acquired in the S1104, the forms-relevant jobs processing module 817 stores in the prescribed-type business form/transaction correspondence table (TBL) 8171 a transaction code "00·11·11" representing "job/mode/title" corresponding to the business-form ID ("001" in the case of the example illustrated in FIG. 3) and the content of the check box ("ordinary deposit payment" in the case of the example mentioned above) (step 8172), to thereby establish the transaction code (step 8174). Further, a field data table 8173 corresponding to the transaction code "00·11·11" is generated, and then the payment amount "30000" and the account number "140257" which are field data read from the processing-subjected prescribed-type business form 300 are stored in the field data table 8173 while establishing correspondence to the field identifying numbers in an effort for facilitating a post processing for establishing correspondences with items for confirmation in the confirmation-dedicated screen image.

Once the transaction code for the payment, money reception or the like has been established, the confirmation-dedicated screen image data for "ordinary deposit payment" is searched and retrieved from the screen display definition file 8 by using as the transaction index the ordinary deposit payment which is the title of the transaction as established, whereon the confirmation-dedicated screen image 410 such as illustrated in FIG. 4B is displayed. In that case, the recognized characters such as the payment amount, the account number and the like stored in the field data table 8173 are displayed, respectively, at designated or predetermined positions in the confirmation-dedicated screen image 410. At the same time, the cut images of the handwritten character strings such as the customer's name on which the recognized characters are based are displayed while establishing correspondences among the cut images. In this conjunction, the recognized character data stored in the field data table 8173 is supplied to the processing "formal check B" 8175. Incidentally, the processing "formal check B" 8175 is so designed as to perform, for example, a formality check corresponding to the contents of the transaction.

Figure 12:
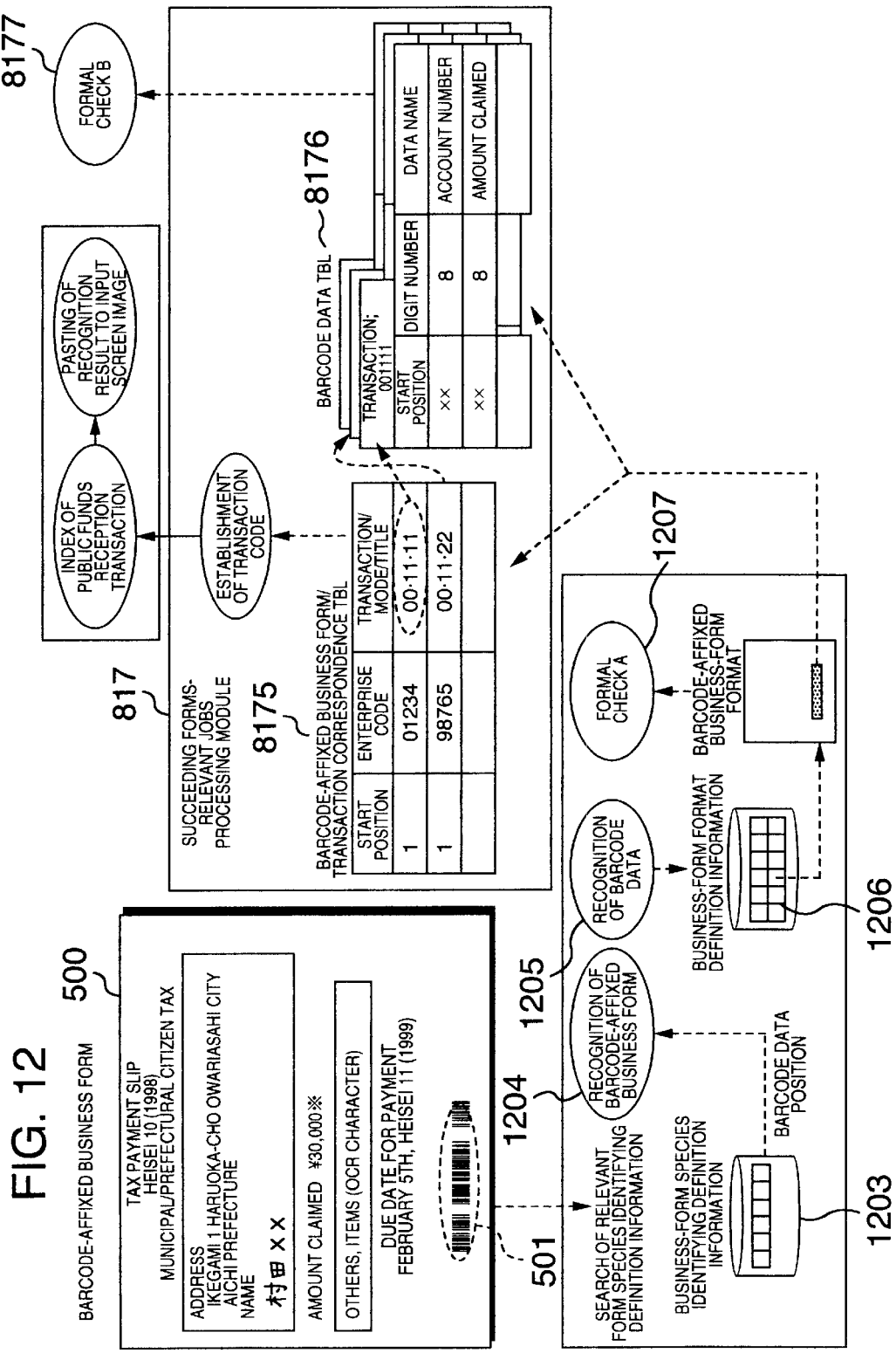
FIG. 12 is a view for illustrating in detail a processing procedure for a barcode-affixed business form such as illustrated in FIG. 5A.

FIG. 12 is a view for illustrating in detail a processing procedure for identifying or deciding discriminatively whether or not a processing-subjected business form is a barcode-affixed business form such as the form 500 illustrated exemplarily in FIG. 5. In this processing procedure, it is first checked by using the form species identifying definition information 1203 for the barcode form identification whether or not a barcode 501 exists in the barcode print field of the barcode-affixed business form 500 illustrated in FIG. 5. In this conjunction, it is noted that the position of the barcode 501 printed on the barcode-affixed business form 500 may differ from one to another barcode form, because the barcode-affixed business forms themselves are issued or prescribed by individual enterprises and/or the local governments, respectively. Such being the circumstances, the coordinate data indicating the print fields are registered as the form species identifying definition information 1203 for every type of the barcode-affixed business form issued by the enterprises and/or the local governments, respectively.

Thus, in this case, the processings described below are carried out.

(1) From the image data read from the processing-subjected business form, the images in the coordinate fields designated by the coordinate data mentioned above are cut, and decision is made as to whether or not a barcode exists in the cut coordinate field. When the barcode is detected, the processing-subjected business form is recognized as the barcode-affixed business form (step 1204).

Subsequently, processing for recognizing the barcode data printed in the barcode field is executed (step 1205), to thereby acquire the enterprise code stated from the start position "1" of the barcode and the transaction mode expressed in barcode or the code of transaction title (step 1205). In succession, the business-form format definition information 1206 for the barcode-affixed business form 500 which corresponds to the enterprise code as recognized is acquired, whereon information concerning the start position of the account number and that of the amount claimed (or billed) set forth in the barcode expression on the barcode-affixed business form having the format which corresponds to the enterprise code is acquired on the basis of the business-form format definition information 1206, to thereby acquire the information of the account number and the amount claimed (or billed) each composed of plural digits and starting from the respective start position. In addition, the characters, images and the like to be recognized in the barcode-affixed business form 500 corresponding to the recognized enterprise code are cut, whereon procedure proceeds to the processing for recognizing the field data.

When it is found at this stage that the barcode-affixed business form now concerned is the barcode-affixed business form 500 illustrated in FIG. 5, then it can be determined that the amount claimed or billed is "30,000" and that the account number is "xx".

(3) Upon completion of the barcode data recognition processing, a processing "formal check processing A" 1207 is executed. Although the processing "formal check processing A" 1207 does not constitute a major part of the present invention for discriminatively determining the species of the business forms, the processing "formal check processing A" 1207 is effective for checking whether or not contradiction is present between the barcode data as recognized and the contents of the written statement or for formal check such as check for omission of the statement. When a formal defect such as omission of statement is found, a corresponding message can be generated on the screen of the display unit 5.

(4) The enterprise code "01234" and the transaction mode or transaction title code "00·11·11" obtained in this manner are stored in the barcode-affixed form/transaction correspondence table (TBL) 8175 of the forms-relevant jobs processing module 817. On the other hand, the account number and the amount claimed or billed are stored in a barcode data table (TBL) 8176 which corresponds to the above-mentioned transaction code "00·11·11" together with the information indicating the start positions of the barcodes and the information indicating the digits number.

Once the transaction code has been established, the forms-relevant jobs processing module 817 searches and retrieves the confirmation-dedicated screen image data for "municipal/prefectural citizen tax payment" illustrated in FIG. 5A from the screen display definition file 8 by using the public utility charge transaction index corresponding to the established transaction code "00·11·11", whereon the confirmation-dedicated screen image 510 such as illustrated in FIG. 5B is displayed. In that case, the recognized characters such as the payment amount, the account number and the like stored in the barcode data table 8176 are also displayed, respectively, at designated or predetermined positions on the confirmation-dedicated screen image 510. At the same time, the cut images of the written character string on the basis of which the character recognition was performed is displayed while indicating correspondence to the recognized character string. In this conjunction, it should be added that the barcode data stored in the barcode data table (TBL) 8176 is made be available for the processing "formal check B" 8177, which is designed, by way of example, for performing formality check corresponding to the content of the transaction.

In connection with the detection of the barcode, a method described below may equally be adopted.

In general, the barcode has features mentioned below.

(a) In the longitudinal direction of the individual line segments constituting the barcode, black pixels exist uniformly over a predetermined length.

(b) In the transversal direction of the barcode, transitions from white to black or vice versa take place many times (at a high frequency) over a unit length.

By taking advantage of the features mentioned above, the fields in which barcodes are printed can be detected from the read image.

More specifically, the barcode detecting method can be carried out by executing the undermentioned processings sequentially by resorting to a candidate screening method.

① A run conversion processing is executed on the input image for checking continuity of the black dots.

② Runs of long and short lengths in the longitudinal direction are deleted from the input image in order to evade confusion among the line segments and the ruled lines.

③ Locations where the number of the white/black transitions over the unit length in the transversal direction exceeds a threshold value are searched.

④ The fields or locations where the conditions ② and ③ mentioned above are met are labeled and consolidation processing of the line segments is executed, to thereby detect a circumscribing rectangle of the barcode field.

The processings mentioned above can be carried out by the barcode recognition processing submodule 223 to identify or decide that the business form now of concern is the barcode-affixed form.

With the barcode detection method described above, there is no necessity of indicating the field where the barcode exists by using the coordinate data, whereby a storage capacity demanded by the business-form format definition file can be reduced correspondingly, to an advantage.

Figure 13:
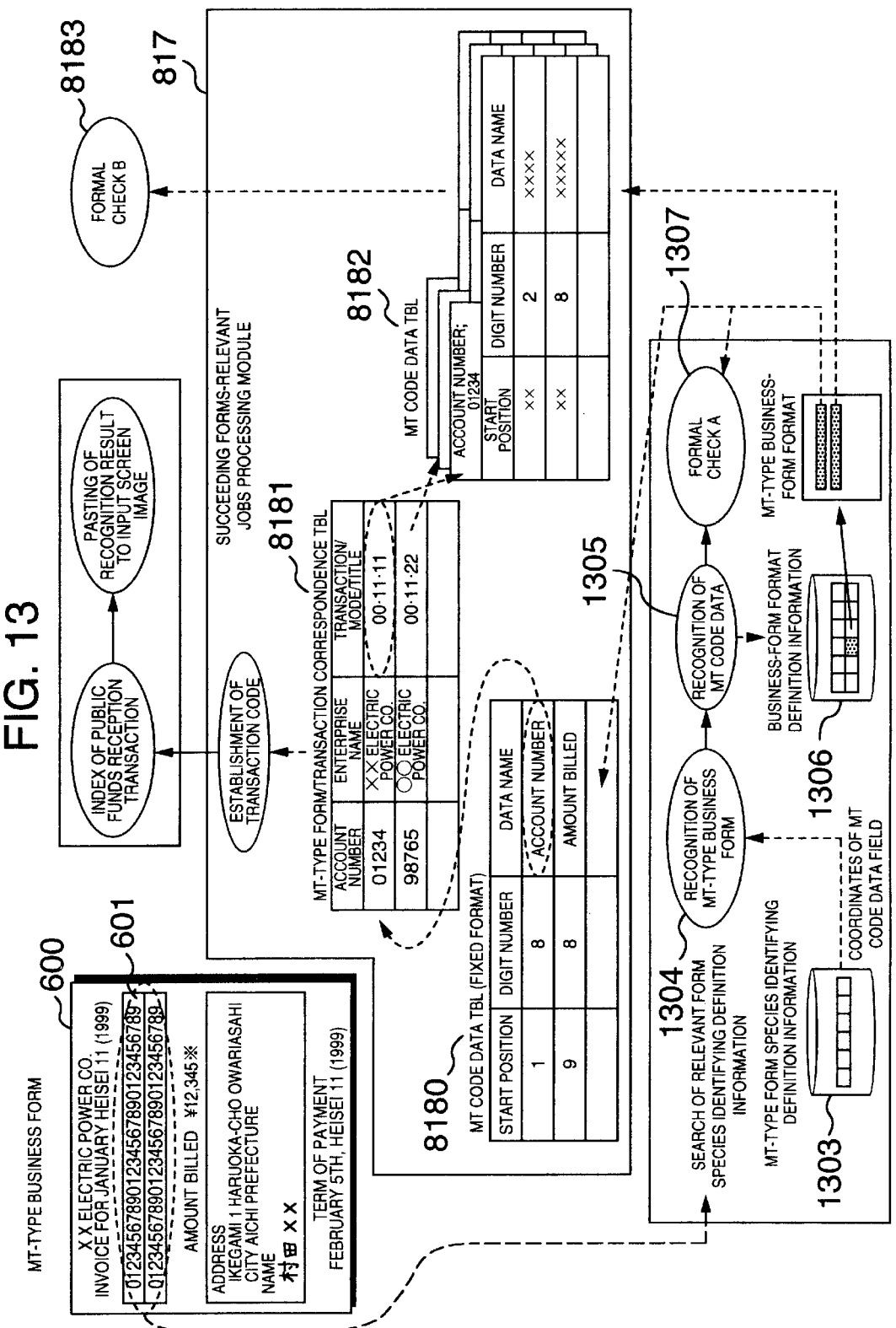
FIG. 13 is a view for illustrating in detail a processing procedure for a format-type business form such as illustrated in FIG. 6A.

FIG. 13 is a view for illustrating in detail a processing procedure for identifying or deciding discriminatively whether a processing-subjected business form is an MT-type business form such as the form 600 illustrated exemplarily in FIG. 6. In the instant processing procedure, it is first checked by using the MT-type form species identifying definition information 1303 whether or not an MT-type business form code represented by a numeral string of plural digits exists in an MT-type form code (numeric code) print field 601 of the MT-type business form 600 illustrated in FIG. 6. In this conjunction, it is noted that the printed position of the form code 601 on the MT-type business form 600 is invariable throughout all the MT-type business forms, because the MT-type business forms themselves are issued or prescribed by The Ministry of Posts and Telecommunications in Japan. Accordingly, the coordinate data indicating the print field(s) can be registered as the form species identifying definition information 1303 corresponding to the MT-type business form.

Now, in the case of the instant processing procedure, processings described below are carried out.

(1) From the image data read from the processing-subjected business form, the image in the coordinate field designated by the coordinate data mentioned above is cut, whereon it is decided whether or not an MT-type form code represented by a numeral string of plural digits exists in the cut image. When the presence of the MT-type form code is detected, then the processing-subjected business form can be recognized as the MT-type business form (step 1304).

(2) Subsequently, recognition processing is performed for "account number" of a predetermined digit number (8 digits in the case of the example illustrated in FIG. 13) which starts from the start position "1" in the MT-type form code field and "amount claimed (or billed)" of a predetermined digit number (8 digits in the case of the example illustrated in FIG. 13) which starts from the start position "9" (step 1305). Data of "account number" and "amount claimed" as recognized are stored in an MT code data table 8180 of the forms-relevant jobs processing module 817. In succession, the business-form format definition information 1306 of the MT-type business form 600 corresponding to "account number" is acquired, whereon information concerning the statement positions (or statement fields) of the enterprise name "xx Electric Power Co." corresponding to the "account number" and the transaction mode code "00·11·11" is acquired on the basis of the business-form format definition information 1306. Then, the image of the positions or fields in which the above-mentioned information is indicated are cut, which is then followed by the character recognition processing for acquiring the enterprise name "xx Electric Power Co." and the transaction mode code "00·11·11". The enterprise name "xx Electric Power Co." and the transaction mode code "00·11·11" as acquired are stored in the MT-type business form/transaction correspondence table 8181 while establishing correspondence to the account number "01234".

Furthermore, the MT code data table 8182 corresponding to the transaction mode code "00·11·11" is generated, whereon the other data recognized from the position(s) or field(s) designated by the business-form format definition information 1306 are stored in the MT code data table 8182 together with the information about the data name, the start position and the digit number.

(3) Upon completion of the MT-type business form data recognition processing, a processing "formal check processing A" 1307 is executed. Although the processing "formal check processing A" 1307 does not constitute a major part of the present invention for discriminatively determining the species or type of the business forms, the processing "formal check processing A" 1307 is effective for checking whether or not contradiction is present between the MT form data as recognized and the contents of the written statement or for formal check such as check for omission of the statement. When a formal defect such as omission of statement is found, a corresponding message can be generated on the screen of the display unit 5.

(4) The transaction code and the MT-type form data obtained in this manner are transferred to the forms-relevant jobs processing module 817. The forms-relevant jobs processing module 817 searches to retrieve the confirmation-dedicated screen image data of the fee or charge payment for "xx Electric Power Co." such as illustrated in FIG. 6A from the screen display definition file 8 by using the public utility charge transaction index which corresponds to the transaction code as determined, whereon the confirmation-dedicated screen image 610 such as illustrated in FIG. 6B is displayed. In that case, the data stored in the MT-type form data table 8182 are displayed, respectively, at designated or predetermined positions on the confirmation-dedicated screen image 610. In this conjunction, it should be added that the MT form data stored in the data table (TBL) 8182 can be made available for the processing "formal check B" 8183, which is designed, by way of example, for performing formality check corresponding to the contents of the transaction.

In conjunction with the detection of the MT code, a method described below can equally be adopted.

① Processing for detecting edges of the business form from the input image data is performed for determining the coordinates of four corners of the business form in the read image to thereby acquire the information check the size of the MT-type business form.

② Because the printed position and the number of characters for the MT-type form code are prescribed by the private standards of the Ministry of Posts and Telecommunications and because the dimensions from the top and left ends, respectively, of the MT-type business form as well as the number of characters are previously registered in an MT-type form species identifying definition information 1303, the printed fields of the MT-type business form are cut by using the data mentioned just above, whereon the characters in the cut field is sliced on a character-by-character basis for recognizing the characters one by one. When it is determined that the number of the characters as recognized is equal to the prescribed number, then the business form now of concern can be identified as the MT-type business form.

The processings mentioned above can be carried out by the character recognition processing submodule 221 for identifying or deciding that the business form now of concern is the MT-type business form.

Figure 14:
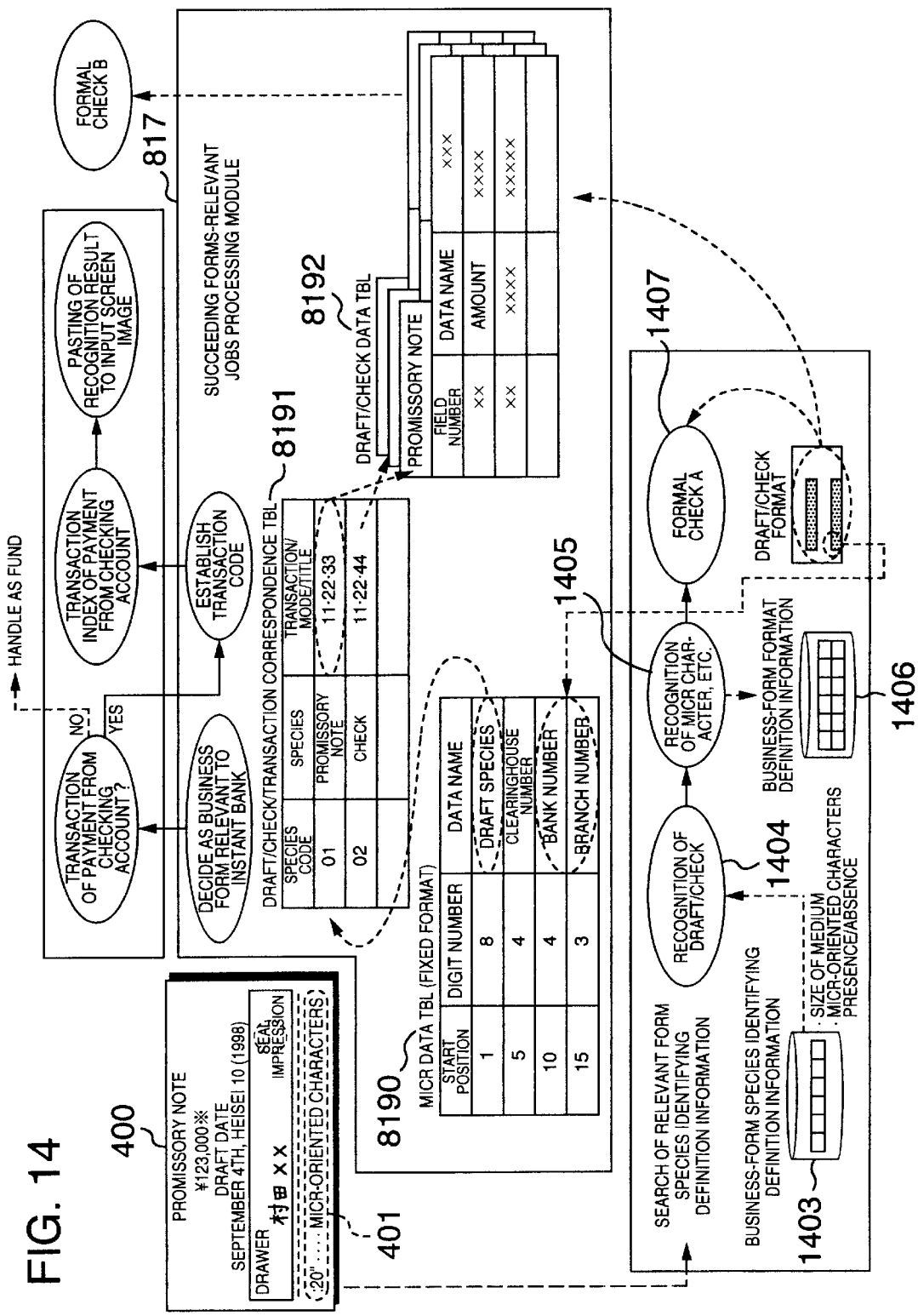
FIG. 14 is a view for illustrating in detail a processing procedure for a promissory note such as illustrated in FIG. 4A.

FIG. 14 is a view for illustrating in detail a processing procedure for identifying or deciding discriminatively whether or not a processing-subjected business form is a promissory note (one sort of the drafts) 400 such as illustrated exemplarily in FIG. 4. In the instant processing procedure, it is first checked by using the promissory-note form species identifying definition information 1403 whether or not an MICR-oriented character string 401 represented by a numeral string of plural digits exists in an MICR-oriented character print field of the promissory note 400 illustrated in FIG. 4 and additionally whether the size of the promissory note is proper one. In this conjunction, it is noted that the printed position of the MICR-oriented characters 401 on the promissory note 400 is same throughout all the promissory notes in accordance with the inter-bank universal standards. Besides, the form size is prescribed to be uniform. Accordingly, the coordinate data indicating the print field(s) for the MICR-oriented characters 401 can be registered as form species identifying definition information 1403 for the promissory notes.

Thus, in the case of the instant processing procedure, processings described below are carried out.

(1) From the image data read from the processing-subjected business form, the image of the coordinate field designated by the coordinate data mentioned above is cut, whereon it is decided whether or not the MICR-oriented character string 401 represented by a numeral string of plural digits exists in the cut image.

Detection of the MICR-oriented characters 401 is performed in the manner described below.

① Processing for detecting edges of the promissory note from the input image data is performed for determining the coordinates of four corners of the promissory note in the read image, to thereby determine arithmetically the size of the promissory note 400 on the basis of the coordinates data as acquired to thereby check the validity thereof.

② Because the printed position of the MICR-oriented characters on the promissory note 400 are designated by the inter-bank universal standards and because the coordinates data of the relevant print field is defined as the business-form format definition information 1403, the image of the field designated by the business-form format definition information 1403 can be cut. Thereafter, the MICR-oriented characters in the cut field is sliced sequentially on a character-by-character basis for thereby performing recognition of the MICR-oriented characters one by one. When it is determined that the number of the characters as recognized is equal to the prescribed number, then the promissory note now of concern can be identified as being valid. Recognition or identification of a check can be performed through similar processing procedure. In that case, since the size of the check differs from that of the promissory note, information concerning the sizes of the check and the promissory note as well as the coordinates data indicating the fields of the MICR-oriented characters on the check and the promissory note should preferably be registered previously as the business-form format definition information 1403.

The processings described above are carried out by the character recognition processing submodule 221 to thereby determine that the business form now of concern is the promissory note (step 1404).

(2) Subsequently, recognition processing is performed for "species of the draft" of a predetermined digit number (e.g. 4 digits) which starts from the start position "1" of the MICR-oriented character string, "identification number (ID No.) of a clearinghouse" of a predetermined digit number (e.g. 4 digits) which starts from the start position "5" of the character string, "identification number of a bank" of a predetermined digit number (e.g. 4 digits) which starts from the start position "10" of the character string and "identification number of a branch" of a predetermined digit number (e.g. 3 digits) which starts from the start position "15" of the character string. The data of "species of the draft", "clearinghouse identification number", "bank identification number" and "branch identification number" as recognized are stored in an MICR data table 8190 of the forms-relevant jobs processing module 817. In succession, the business-form format definition information 1406 of the promissory note 400 corresponding to the data "species of the draft" is acquired, whereon an image of the field in which prescribed particulars to be confirmed in conjunction with the "species of the draft" is cut on the basis of the business-form format definition information 1406 mentioned above, to thereby perform the character recognition of "bank identification number", "branch identification number" and others. Additionally, a processing "formal check processing A" 1407 is carried out by making use of the result of the recognition. Although the processing "formal check processing A" 1407 does not constitute a major part of the present invention for discriminatively determining the species of the business forms, this processing "formal check processing A" 1407 is effective for deciding whether or not contradiction is present in the draft/check data and the contents of the statement (s) as recognized or for formal check such as for omission of statement(s). When a formal defect such as the omission of statement is found, a corresponding message can be generated on the screen of the display unit 5.

Further, image of the field designated by the business-form format definition information concerning the "species of the draft", e.g. image of the field in which the transaction mode code "11·22·33" is set forth is cut to be stored in a draft/check/correspondence table 8191, and then a draft/check data table 8192 corresponding to the transaction mode code "11·22·33" is prepared, whereon the data such as those of the characters and/or the images recognized from the fields designated by the business-form format definition information 1406 as well as data names thereof are stored in the draft/check data table 8192.

The draft/check data obtained in this manner are transferred to the forms-relevant jobs processing module 817, which responds thereto by retrieving the promissory note confirming screen data illustrated in FIG. 4 from the screen display definition file 8, to thereby display a confirmation-dedicated screen image 410 such as illustrated in FIG. 4B, wherein the recognized characters and the seal impression are displayed at designated positions on the confirmation-dedicated screen image 410. Additionally, a reduced image of the draft as a whole is also displayed. The draft/check data stored in the draft/check data table 8192 can be made available for the processing "formal check B" 8193, which is designed for performing, for example, formality check corresponding to the content of the transaction.

Figure 10:
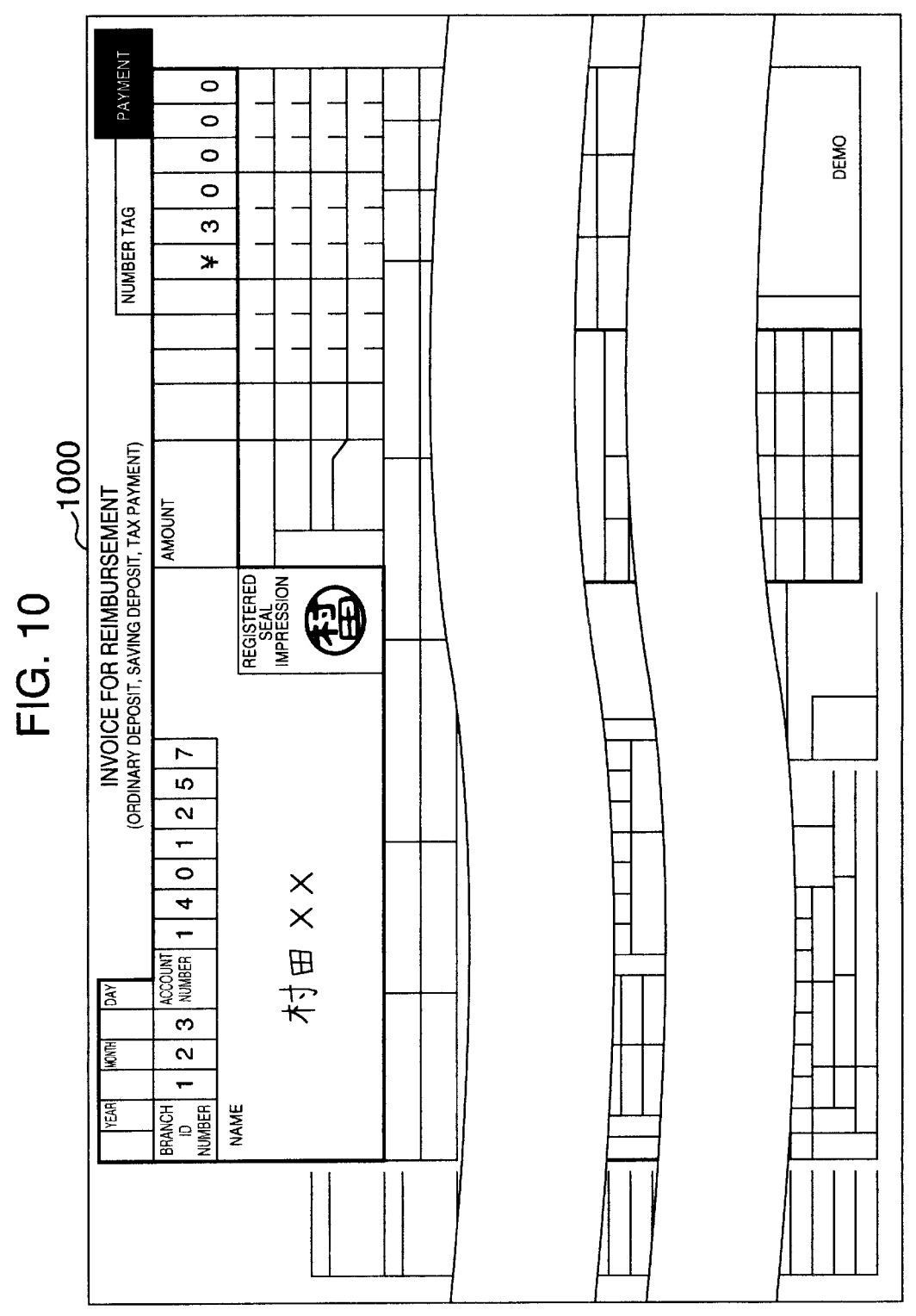

Finally, in the case of the layout-prescribed business form illustrated exemplarily in FIG. 10, (1) information of the line segments found in the business form (e.g. start and end point coordinates of the line segments, sorts of the line segments, etc.), and (2) features of the character strings of a header (e.g. "payment slip" and the like) are previously stored in the business-form format definition information file 7 as the business-form format definition information of image data type. Subsequently, the image data type format definition information for the recognition-subjected business form is fetched from the business-form format definition information file 7, whereon the business-form format definition information undergoes matching processing with the information concerning the coordinates of the line segments, those of the read image of the header field and the features of the character strings as found in the business form, whereby the business form of the layout having highest similarity is discriminatively determined as the layout-prescribed species business form.

Many features and advantages of the present invention are apparent from the foregoing detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the form size check processing has been described in conjunction with the draft/check. However, this processing can be executed for the business forms of the other species.

Further, in the foregoing description of the preferred embodiments of the invention, it has been presumed that only predetermined portion(s) of the read information is displayed. However, all the information may be displayed with the portions of importance being displayed by changing color or brightness appropriately. Furthermore, although it has been described that the image reading device is so arranged as to read the image of a business form disposed on the pedestal, the present invention is never restricted to such structure of the image reading device. It goes without saying that various types image reading devices inclusive of a form insertion type machine such as facsimile equipment may be employed as well.

Accordingly, all suitable modifications and equivalents may be resorted to, falling within the spirit and scope of the invention.

As is apparent from the foregoing description, the present invention has provided a business form handling method and a system for carrying out the same in which an identifying procedure is established for identifying species of a processing-subjected business form among plural species of business form in accordance with a predetermined sequence, identification of species of the business forms is executed in accordance with the identifying procedure, subordinate attributes of the identified business form is then identified, an image of a field defined by format definition information inherent to the result of the identification is cut, and then a recognition processing is performed for recognizing the contents of the business form from the cut image. Thus, according to the teachings of the present invention, identification of the species of large variety of business forms can be realized easily within a significantly reduced time.

On the other hand, the user or operator is required merely to place the processing-subjected business form on the pedestal of the image reading device for identifying the species of the business form. Then, the portion(s) of the business form which requires confirmation by the operator is displayed on a display unit. Thus, manipulations involved in the business form identifying processing can be extremely simplified and facilitated with efficiency of attendant work being remarkably improved and enhanced. Besides, in combination with the reduction of time involved in the identification processing, the services or tasks at the window or the like business in the financial institutions and others where the business forms are handled can be performed very speedily, to great comfortableness for the customers. Thus, by installing the business form processing system according to the invention at a service counter or window or the like place in financial institutions, retail stores or shops and the like which handle a large variety of the form species, operation efficiency of the apparatus or system designed for carrying out the succeeding forms-relevant jobs processings with the information read by the business form processing system can be enhanced significantly, to another advantage.

As will now be understood, according to the teachings of the invention, the identification of the business forms of various species can be realized easily within a short time. Besides, for the business form having the subordinate attributes, the contents of statement(s) of that business form can also be recognized by referencing the inherent format information.

What is claimed is:

1. A method of handling business forms by reading contents set forth on processing-subjected business forms by an image reading device, recognizing the contents set forth on the business forms from images as read, and performing processing in accordance with the contents set forth on the business forms, comprising the steps of:

reading by an image reading device business forms of plural species which differ from one another in respect to a field of the image to be cut;

determining whether or not the read image is relevant to a business form of a first species by referencing form species identifying definition information stored previously in a file; and cutting an image from a field corresponding to a format inherent to said business form of the first species when said read image is relevant to said business form of the first species, to thereby recognize the-contents of statement from said cut image, whereas when said read image is not related to said business form of the first species, determining whether or not the read image is relevant to a business form of a second species by referencing the form species identifying definition information stored previously in the file; and cutting an image from a field corresponding to a format inherent to said business form of the second species when said read image is relevant to said business form of the second species, to thereby recognize the contents of statement from said cut image; and when said read image is not related to said business form of the first species and second species, determining whether or not the read image is relevant to a business form of a next species of a plurality of species in a predetermined priority order by referencing the form species identifying definition information stored previously in the file; and cutting an image from a field corresponding to a format inherent to said business form of the next species when said read image is relevant to said business form of the second species, to thereby recognize the contents of statement from said cut image.

2. A method of handling business forms by reading contents set forth on a processing-subjected business form by an image reading device, recognizing the contents set forth on the business form from an image as read and performing processing in accordance with the contents set forth on the business form, comprising the steps of:

recognizing whether or not a processing-subjected business form is an identifier-affixed business form which is affixed with an identifier at a predetermined position among those of plural species; and cutting an image conforming to a format of said identifier-affixed business form when said processing-subjected business form is the identifier-affixed business form to thereby recognize contents of said cut image, whereas when said processing-subjected business form, is not the identifier-affixed business form, recognizing whether or not said processing-subjected business form is a barcode-affixed business form, and cutting an image conforming to a format of said barcode-affixed business form when said processing-subjected business form is the barcode-affixed business form, to thereby recognize contents of said cut image, while when said processing-subjected business form is not the barcode-affixed business form, recognizing whether or not the processing-subjected business form is an MICR business form having MICR (Magnetic Ink Character Recognition)-oriented characters recorded thereon; and cutting an image conforming to a format of said MICR business form when said processing-subjected business form is the MICR business form, to thereby recognize contents of said cut image; and unless said processing-subjected business form is recognized as any one of said identifier-affixed business forms, said barcode-affixed business form and said MICR business form, inputting identification information of said processing-subjected business form through an input unit; and cutting an image of a field conforming to a business-form format which corresponds to said identification information inputted, to thereby recognize the contents set forth from the cut image; and performing relevant jobs processing for said processing-subjected business form in accordance with result of the recognition validated for said processing-subjected business form.

3. A business form handling system for reading contents set forth on a processing-subjected business form by an image reading device, recognizing the contents set forth on the processing-subjected business form from an image as read, comprising:

a business form definition information file in which definition information for identifying business forms of plural species is registered previously;

a business form species identifying module for determining which of said plural species said processing-subjected business form belongs to through a processing for matching a read image of said processing-subjected business form read by said image reading device with said definition information; and a character recognition processing module for cutting an image of a field set previously as a subject for recognition in the business form definition information for said determined species, to thereby perform character recognition for an image set as a subject for a character recognition in said cut image, wherein said business-form species identification module references said business-form definition information file, to thereby recognize whether or not the processing-subjected business form is affixed with an identifier at a predetermined position, for thereby identifying species of said processing-subjected business form as an identifier-affixed species when said processing-subjected business form is affixed with the identifier, unless said processing-subjected business form is the identifier-affixed business form, recognize whether or not said processing-subjected business form is affixed with a barcode, for thereby identifying species of said processing-subjected business form as a barcode-affixed species when the barcode is affixed to said processing-subjected business form, unless said processing-subjected business form is the barcode-affixed business form, recognize whether or not said processing-subjected business form is an MICR business form having MICR-oriented data recorded thereon, for thereby identifying species of said processing-subjected business form as the MICR form species; and when said processing-subjected business form is recognized to be none of said identifier-affixed business form, said barcode-affixed business form nor said MICR business form, input identification information indicating a species of said processing-subjected business form, for thereby identifying the species of said processing-subjected business form.

4. An image processing apparatus, comprising:

an input control unit for inputting an image of a processing-subjected business form to thereby perform a control for correcting skewness of said image;

a business form identifying module for fetching business-form format definition information stored in a file designed for storing formats of business forms to compare said definition information with the image undergone the correction of skewness by said input control unit, for thereby identifying species of said business form;

a recognition module for recognizing said image on the basis of a result of the identification performed by said business form identifying module; and a display control unit for performing a control for displaying result of the recognition performed by said recognition module on an external display unit, wherein said identification module references said business-form format definition information, to thereby recognize whether or not the processing-subjected business form is affixed with an identifier at a predetermined position, for thereby identifying species of said processing-subjected business form as an identifier-affixed species when said processing-subjected business form is affixed with the identifier, unless said processing-subjected business form is the identifier-affixed business form, recognize whether or not said processing-subjected business form is affixed with a barcode, for thereby identifying species of said processing-subjected business form as a barcode-affixed species when the barcode is affixed to said processing-subjected business form, unless said processing-subjected business form is the barcode-affixed business form, recognize whether or not said processing-subjected business form is an MICR business form having MICR-oriented data recorded thereon, for thereby identifying species of said processing-subjected business form as the MICR form species; and when said processing-subjected business form is recognized to be none of said identifier-affixed business form, said barcode-affixed business form nor said MICR business form, input identification information indicating species of said processing-subjected business form, for thereby identifying the species of said processing-subjected business form.

5. A method of handling business forms by reading contents set forth on a processing-subjected business form by an image reading device, recognizing the contents set forth on the business form from an image as read and performing processing in accordance with the contents set forth on the business form, comprising the steps of:

determining whether or not a processing-subjected business form is an identifier-affixed business form which is affixed with an identifier at a predetermined position among those of plural species;

cutting an image conforming to a format of the identifier-affixed business form when the processing-subjected business form is the identifier-affixed business form to thereby recognized contents of the cut image, whereas when the processing-subjected business form is the identifier-affixed business form, determining whether or not the processing-subjected business form is a business form affixed with identifying information capable of identifying a specie of the business form, when the processing-subjected business form is a business form affixed with identifying information capable of identifying a specie of the business form, cutting an image conforming to a format of the business form affixed with identifying information and recognizing contents of the cut image, and performing relevant jobs processing for the processing-subjected business form in accordance with result of the recognition validated for the processing subjected business form.

6. A method of recognizing business forms, comprising the steps of:

reading an image of a business format;

determining whether or not the business form thus read is a prescribed-type business form;

when it is determined that the business form thus read is a prescribed-type business form, cutting and recognizing an image of a predetermined portion corresponding to the prescribed-type business form;

when it is determined that the business form thus read is not a prescribed-type business form, determining the business form thus read as a non-prescribed-type business form and determining whether or not the non-prescribed-type business form conforms to a condition registered in advance; and when the non-prescribed-type business form conforms to the condition registered in advance, cutting and recognizing an image of a predetermined portion corresponding to the non-prescribed-type business form in accordance with the condition; and when the non-prescribed-type business form does not conform to the condition registered in advance, determining the non-prescribed-type business form as a business form not to be recognized.

7. A method of recognizing business forms according to claim 6, wherein the prescribed-type business form contains an identifier at a predetermined position thereof, and the non-prescribed-type business form contains a barcode or MICR (magnetic ink character recognition)-oriented characters or segment information or a character string of a header.

* * * * *